(12) United States Patent
Arnaud

(10) Patent No.: US 7,537,696 B2
(45) Date of Patent: *May 26, 2009

(54) METHOD AND APPARATUS FOR TREATMENT OF WASTEWATER EMPLOYING MEMBRANE BIOREACTORS

(75) Inventor: Johnny Arnaud, Houston, TX (US)

(73) Assignee: Hydroteat, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/901,421

(22) Filed: Sep. 17, 2007

(65) Prior Publication Data

US 2008/0006571 A1    Jan. 10, 2008

Related U.S. Application Data

(60) Division of application No. 10/934,195, filed on Sep. 3, 2004, now Pat. No. 7,285,212, which is a division of application No. 10/317,018, filed on Dec. 11, 2002, now Pat. No. 6,805,806, which is a continuation-in-part of application No. 09/879,496, filed on Jun. 12, 2001, now Pat. No. 6,669,843.

(51) Int. Cl.
*B01D 63/06* (2006.01)
*B01D 63/16* (2006.01)

(52) U.S. Cl. .............. 210/321.64; 210/321.68; 210/321.8; 210/321.81; 210/330

(58) Field of Classification Search .......... 210/321.67, 210/321.68, 321.8, 321.81, 330, 321.64
See application file for complete search history.

(56) References Cited

U.S. PATENT DOCUMENTS

| | | | |
|---|---|---|---|
| 2,735,547 A | 2/1956 | Vissac | |
| 3,289,608 A | 12/1966 | Laval, Jr. | |
| 3,447,511 A | 6/1969 | Beard et al. | 123/3 |
| 3,507,397 A | 4/1970 | Robinson | |
| 3,512,651 A | 5/1970 | Laval, Jr. | |
| 3,568,837 A | 3/1971 | Laval, Jr. | 210/136 |
| 3,947,364 A | 3/1976 | Laval, Jr. | |
| 4,024,912 A | 5/1977 | Hamrick et al. | 48/61 |
| 4,237,006 A | 12/1980 | Colman et al. | |
| 4,330,038 A | 5/1982 | Soukup et al. | 166/267 |
| 4,790,942 A | 12/1988 | Shmidt et al. | 210/650 |
| 4,906,370 A | 3/1990 | Galaj et al. | 210/321.67 |
| 5,000,848 A | 3/1991 | Hodgins et al. | 210/321.68 |
| 5,021,165 A | 6/1991 | Kalnins | 210/703 |
| 5,071,542 A | 12/1991 | Tuszko et al. | |

(Continued)

FOREIGN PATENT DOCUMENTS

GB    2174984 A    11/1986

OTHER PUBLICATIONS

Filtration News™, vol. 22, No. 1, Jan./Feb. 2004, Flowmatic, Robert W. Chin.

(Continued)

*Primary Examiner*—David A Reifsnyder
(74) *Attorney, Agent, or Firm*—Howrey LLP

(57) ABSTRACT

Methods and apparatus employing membrane filtration in biodegradation processes for treatment of wastewater are described. An ultrafilter is described as well as a bioreactor system having an equalization system, a membrane bioreactor system, and a controller. Aeration systems for a membrane bioreactor, such as a mixer, and an ultrafilter subsystem are also described, as is a rotary membrane ultrafilter.

12 Claims, 21 Drawing Sheets

U.S. PATENT DOCUMENTS

| | | | |
|---|---|---|---|
| 5,131,757 A | 7/1992 | Smith | |
| 5,362,395 A | 11/1994 | Dorau et al. | 210/638 |
| 5,435,975 A | 7/1995 | Bastos | 422/168 |
| 5,451,349 A | 9/1995 | Kingsley | 261/91 |
| 5,478,484 A | 12/1995 | Michaluk | 210/788 |
| 5,639,371 A | 6/1997 | Loy et al. | 210/195.3 |
| 5,647,977 A | 7/1997 | Arnaud | 210/167 |
| 5,794,791 A | 8/1998 | Kindig | 209/727 |
| 5,820,259 A | 10/1998 | Cummins et al. | 366/163.2 |
| 5,824,222 A | 10/1998 | Keyser et al. | 210/806 |
| 5,882,530 A | 3/1999 | Chase | 210/788 |
| 5,906,746 A | 5/1999 | Helmo et al. | 210/614 |
| 5,944,998 A | 8/1999 | Rolchigo et al. | 210/654 |
| 6,017,198 A | 1/2000 | Traylor et al. | 417/390 |
| 6,024,874 A | 2/2000 | Lott | 210/512.1 |
| 6,032,931 A | 3/2000 | Plunkett | 261/77 |
| 6,080,317 A | 6/2000 | Wagner et al. | 210/652 |
| 6,106,713 A | 8/2000 | Miller et al. | 210/321.63 |
| 6,165,365 A | 12/2000 | Salyer et al. | 210/650 |
| 6,168,724 B1 | 1/2001 | Hurwitz | 210/780 |
| 6,299,343 B1 | 10/2001 | Pekerman | 366/163.2 |
| 6,630,067 B2 | 10/2003 | Shieh et al. | 210/259 |
| 2002/0148779 A1 | 10/2002 | Shieh et al. | 210/605 |
| 2003/0168211 A1 | 9/2003 | Arnaud | 166/68 |
| 2003/0173276 A1 | 9/2003 | Arnaud | 210/143 |
| 2003/0173288 A1 | 9/2003 | Arnaud | |
| 2004/0031742 A1 | 2/2004 | Arnaud | 210/259 |

OTHER PUBLICATIONS

Rob Schook, Development of an Inline Deliquidiser, pp. 20, 22 and 25, (undated).

"Fundamentals of *General Chemistry*", C. H. Sorum, University of Wisconsin, (undated).

"Chemical Calculations An Introduction to the Use of Mathematics in Chemistry", Sidney W. Benson, University of Southern California, (undated).

"Fluid Mechanics With Engineering Applications", R. L. Daugherty, California Institute of Technology, 1954.

"Equipment and Applications For Industry", Claude Laval Corporation, (undated).

"Industrial Process Problem Solving . . . Solids/Liquids and Liquid/Liquid Hydrocyclones for Separation, Classification, and Dewatering", © 1995 Krebs Engineers.

Demco Cyclone Separators Catalog CI-78, Aug. 15, 1978.

Geosource® The Pioneer in solids/liquid separation, 1979 Catalog.

Hydrocyclones Problem Solving in Liquid/Solids Separation, Picenso International Inc., (undated).

"Facts about liquid cyclones. Where to use them. Where not to use them. And how to specify the right cyclone for the job. With special emphasis on The Dorrclone®"; © 1979 Dorr-Oliver Incorporated.

"Porous Plastics" Porex®, © 1998 Porex Technologies Corp.

"Nitroxy Siliporite® Molecular Sieves for Medical Oxygen Concentrations" CESA, (no date).

"New Trends In Air Separation Adsorbents" by Marie-Theres Grandmougin, et al.; CECA, France, (undated).

"Clarifying Oilfield and Refinery Waste Waters by Flotation;" Journal of Petroleum Technology, pp. 426-430, dated Apr. 1973.

"Membrane Bioreactors for Wastewater Treatment;" by Tom Stephenson, et al.; dated 2000, reprinted 2001.

"New Developments in High Shear Crossflow Membrane Filtration;" Fluid/Particle Separation Journal, pp. 123-138, vol. 4, No. 1, Mar. 1991.

"The Application of Demulsification Chemicals in Recycling, Recovery and Disposal of Oily Waters;" Sam Delchad, Ph. D., Emulsions Control Inc. California (no date).

EPA Technical Bulletin, EPA 456/F-99-006R; "Nitrogen Oxides (NO*x*), Why and How They Are Controlled;" Nov. 1999.

"Superior Nitrate Removal for Treatment Plants and the Home;" Sybron Chemicals Inc.; Ionic® SR-7 Advanced Anion Exchange Resin, (undated).

Solicitation for Financial Assistance Applications No. DE-PS26-02NT41613; "Development of Technologies and Capabilities for Developing Coal, Oil and Gas Energy Resources;" p. 55, "3. Gas Flooding", (undated).

Office Action mailed from the U.S. Patent and Trademark Office on Dec. 18, 2008 for U.S. Appl. No. 10/979,793.

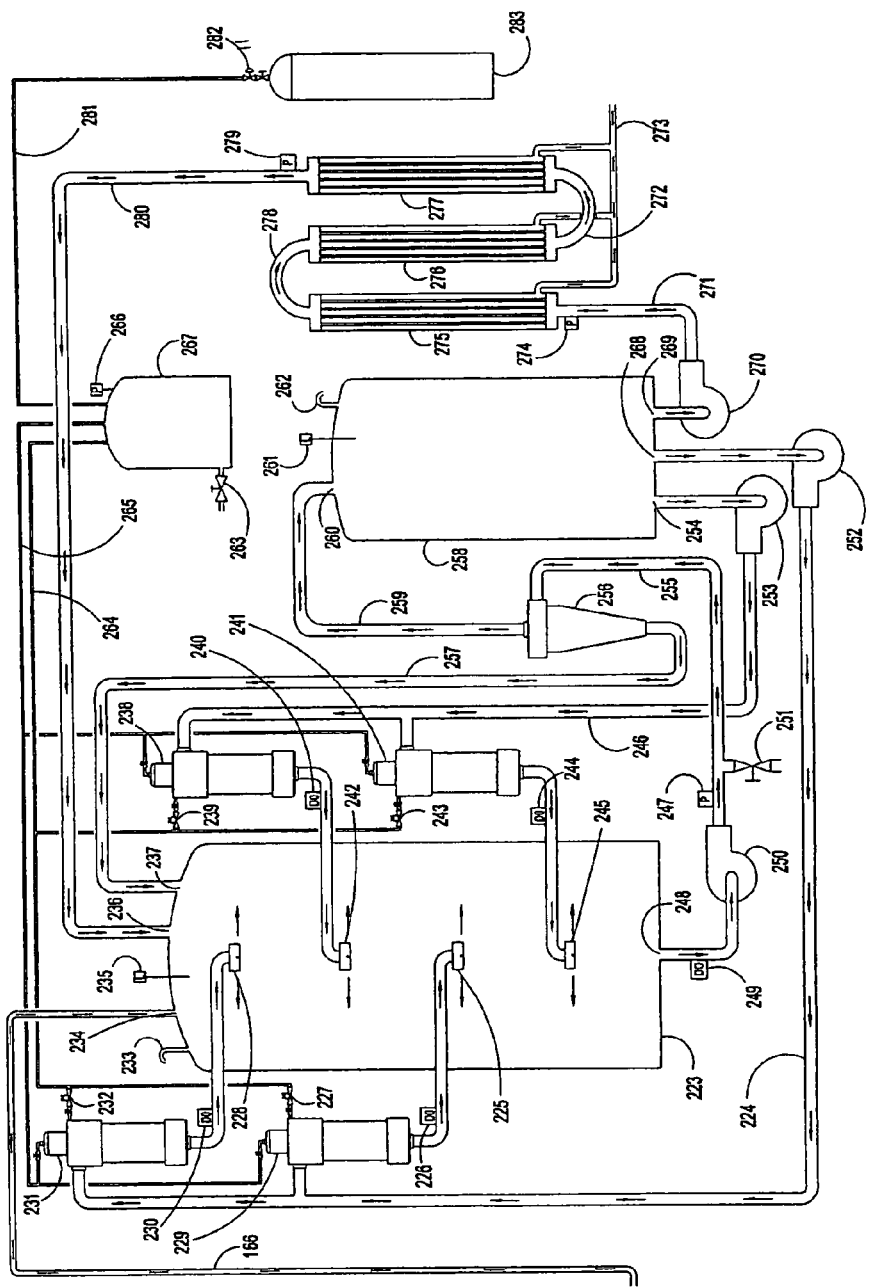
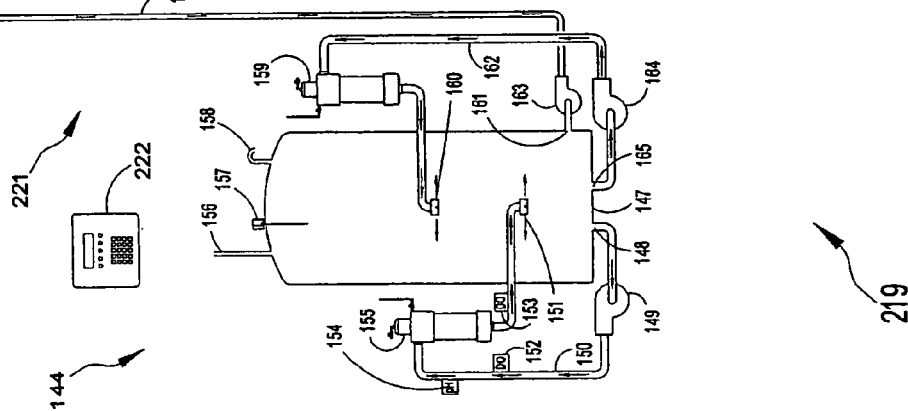
FIG 11

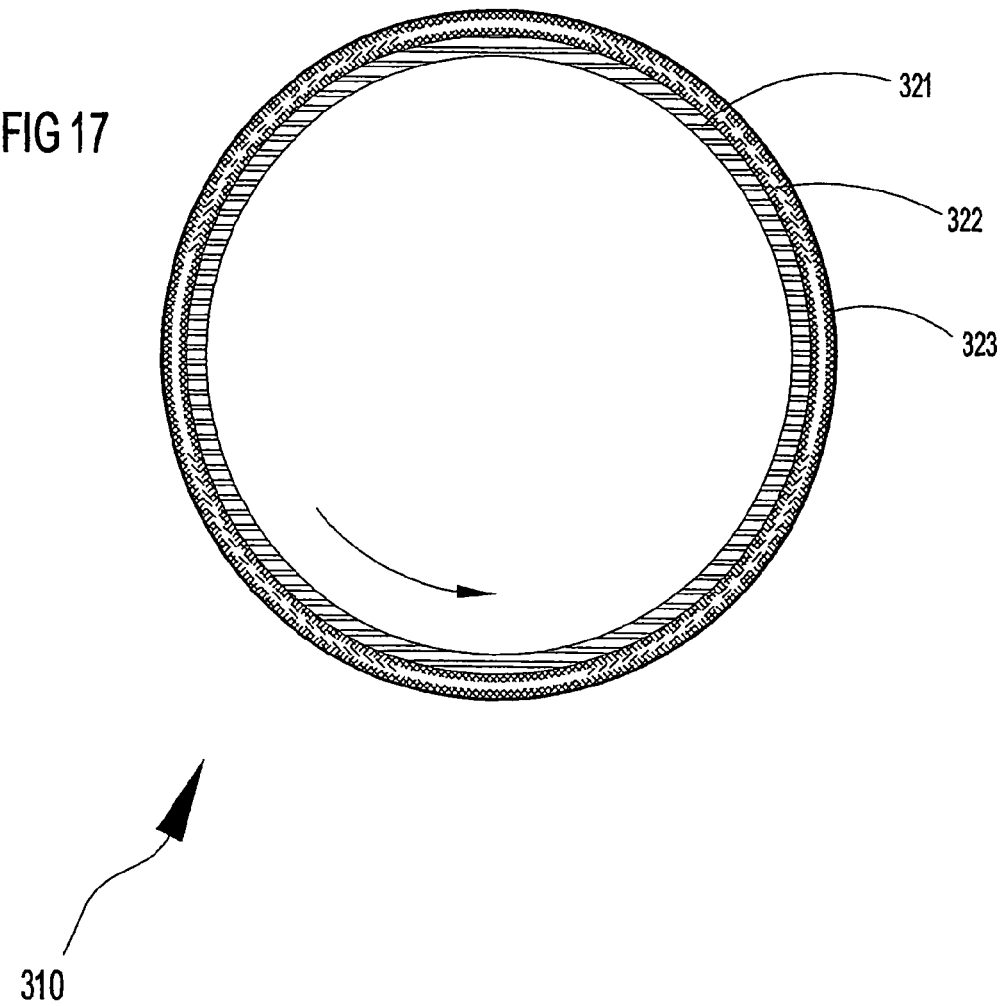

METHOD AND APPARATUS FOR TREATMENT OF WASTEWATER EMPLOYING MEMBRANE BIOREACTORS

CROSS REFERENCE TO RELATED APPLICATIONS

This application is a divisional of application Ser. No. 10/934,195, filed Sep. 3, 2004, entitled "Method and apparatus for Treatment of Wastewater Employing membrane Bioreactors," now U.S. Patent No. 7,285,212, which was a divisional of application Ser. No. 10/317,018 having the same title, filed Dec. 11, 2002, now U.S. Pat. No. 6,805,806, which was a continuation-in-part of patent application Ser. No. 09/879,496, filed Jun. 12, 2001, entitled "Method and Apparatus for Mixing Fluids, Separating Fluids, and Separating Solids from Fluids," by Johnny Arnaud, U.S. Pat. No. 6,669,843, each of which is hereby incorporated by reference in its entirety.

BACKGROUND OF THE INVENTION

1. Field of the Invention

The present invention relates to methods and apparatus employing membrane filtration in biodegradation processes (called "membrane bioreactors") for treatment of wastewater containing organic contaminates.

2. Description of Related Art

Chemical compounds containing carbon are designated as organic compounds and may include compounds derived from living organisms. Biodegradable materials are those capable of being decomposed by biological means as by bacterial action. Biodegradable materials are those that serve as food for bacteria. The bacteria are naturally occurring. Therefore, processes employing biodegradation are seen to be "nature's way" and in many cases preferred over other methods of removing organic compounds that contaminate wastewater derived from industrial and other processes.

Bacteria are active only at the limited outer surface of the contaminants to be consumed as food. The bacteria produce enzymes to disperse the contaminants and increase the amount of surface, and the amount of food, available to them. A different enzyme may be required to disperse each contaminant present.

When food is available and the right supporting conditions are present, bacteria can reproduce in large quantities in very short periods of time. Catabolism is the process by which bacteria change, or decompose, the contaminants into simpler compounds, also known as destructive metabolism. It is a chemical oxidation-reduction process for organic carbon removal that is either aerobic (those occurring in the presents of dissolved oxygen) or anaerobic (those occurring in the complete absence of oxygen). The bacteria and the man made systems in which the biodegradation processes occur are also designated as either aerobic or anaerobic. Both dissolved and solid organic wastes are decomposed to gases. The gases are carbon dioxide if the process is aerobic or carbon dioxide and methane if anaerobic. The aerobic process is much faster at the destruction of most organic contaminants and is the primary emphasis of the present invention.

The organic matter is normally a very small percentage of the contaminated wastewater and is dispersed throughout the entire content of the wastewater in which it is contained. The systems in which the biodegradation processes occur are typically very large to provide the retention time required for the bacteria to reach and consume the small percentage of organic waste. It is extremely difficult if not impossible to supply the dissolved oxygen needed to promote aerobic bacterial activity in highly diluted system.

The processes are enhanced when the organic matter can be concentrated into a smaller quantity of wastewater. A filter capable of concentrating the organic matter to an optimum level by removing a large part of the water would accelerate the biodegradation process and require a much smaller system. The suspended organic solids, dissolved organic matter, and the bacteria are called "biomass." The container in which the biodegradation occurs is a biological reactor called a "bioreactor." Suspended solids and dissolved minerals that precipitate from the incoming wastewater also adds to the suspended solids accumulated in the bioreactor. The filtration system selected for application in biodegradation processes is a membrane assembly called an "ultrafilter." The system in which the membrane is applied to the biodegradation process is called a "membrane bioreactor" (MBR). Supplying the oxygen required to promote bacterial activity even in small biological process systems is a major problem experienced by the entire biodegradation process industry on a worldwide basis.

Generally, membranes are used in reverse osmosis, nanofilters, ultrafilters, and microfilters. Reverse osmosis and nanofilters membranes are able to separate dissolved ions from water and are referred to as semi-permeable membranes. Ultrafilters and microfilters have porous membranes and accomplish separation mechanically. The ultrafilter can remove suspended solids and dissolved substances with a cutoff point by molecular weight depending on the size of the pores. Membranes are synthetically produced from materials selected to have specific properties. The membranes are manufactured in the form of tubes, hollow fibers, and sheets.

In all membranes water is kept flowing along the surface of the membrane in a sweeping or washing motion called "cross flow" to prevent excessive concentration of solids on its surface. The cross flow results in shearing the solids from the membrane surface and prevents fouling.

The membranes are assembled in a configuration called a module or an element. The module, or element, is the smallest assembly that can be purchased, and is, therefore, referred to as the membrane. Applying a membrane coating on the inside of porous tubes produces tubular membranes. The coating becomes the membrane and the porous tube serves as the backing or reinforcement for the membrane surface. The feed wastewater enters the tube and some of the water is separated from the solids and passes through the membrane and porous tube. The water that passes through the membrane is called "permeate." The part of the biomass including wastewater, suspended solids, and dissolved organic solids that do not pass through the membrane as permeate is called "reject." The amount of permeate a membrane can produce per unit of membrane area is called "flux rate" and is a function of the differential pressure across the membrane and the effectiveness of the cross flow at keeping the membrane from fouling.

In applications where wastewater has high solid concentrations, the tubular membrane has the advantage of allowing high velocity cross flow inside the tubes to sweep the solids and minimize sticking to the membrane surface and reducing the capacity. The result of the deposit on the membrane surface is called "fouling." While the tubular membrane is used in the disclosure of the present invention it is understood that it is not intended to be a limitation of the invention.

Hollow fiber membranes may be very small in diameter. The thin outside skin is the membrane and the porous layer acting as the support medium. Feed water is introduced around the outside of the hollow fiber. The water is separated from the solids as it passes through the thin outer layer, flows through the porous support layer to the inside of the hollow tube, and then out the end. The hollow fiber module contains an enormous amount of fibers that account for the large surface area of this type membrane.

Sheet membranes are made by modifying the surface of a thicker sheet to from a dense, microporous film on top and serves as the working membrane that actually rejects the solids and large molecular weight solutions as water flows through. The function of the remaining and thicker part of the sheet is to provide support. The sheet membranes are made by winding two large sheets in a spiral, called "spiral wound membranes," with two membrane surfaces facing each other and placing a spacer between the support sides of the two sheets as they are rolled into a coil. The spiral wound membrane has not played a significant roll in the wastewater treatment industry. The sheet membranes are also made in the form of discs. The discs are assembled by stacking the discs in a module. The disc membrane has some application in wastewater treatment.

Membrane bioreactors have been used commercially for 20 years or more. The European and other foreign industries appear to be ahead of the United States in developing the technology and applying it to biodegradation processes. The state of technology commercialization is well documented in "*Membrane Bioreactors for Wastewater Treatment*," Tom Stephenson, Simon Judd, Bruce Jefferson, and Keith Brindle, IWA Publishing, London, UK, © 2000 IWA Publishing and the authors.

The biological processes that allow the entire biomass to be in free suspension in the wastewater are called "suspended growth" processes. Good mixing is required in suspended growth systems to ensure bacterial contact with the entire organic content of the systems. In other biological processes fixed structures of material not consumed by bacteria are provided on which the bacteria can grow. Those biological processes are classified as "fixed film" processes. The wastewater containing the organic matter in fixed film processes has to be brought into contact with the bacteria on the support structures, therefore, also requiring some form of mixing.

Membrane bioreactor systems are also identified by the function of the membranes applied and where they are located in the systems. There are membranes used for separation of biomass, some are submerged in the biomass and used as a fixed film through which bubble-less pure oxygen is supplied to the bacteria attached to the outside of the membranes, and some are used for extracting inorganic materials that may inhibit the activity of the bacteria in degradation of certain toxic compounds in wastewater. The methods and apparatus of the present invention corrects deficiencies of the biomass separation systems, enhances energy operating efficiency, and may totally replace the need for most submerged fixed-film membrane bioreactor systems used to supply bubble-less pure oxygen to the bacteria. The extracting membrane bioreactors are applied for special purposes and can be used in conjunction with or without the other membrane bioreactor processes. Therefore, extracting membrane bioreactor processes are not addressed in the present invention.

In biomass separation bioreactor systems the membranes are used to separate and concentrate the biomass by removing wastewater. In one type separation system the membranes are located in a sidestream outside the bioreactor. The biomass is drawn from the bioreactor and pumped through the membranes where wastewater is removed as permeate and suspended organic and mineral solids, dissolved organic matter, and bacteria are retained and returned to the bioreactor more concentrated. In this configuration, the biomass is under pump pressure when flowing through the membranes and provides the differential pressure across the membrane.

In other biomass separation systems the membranes are submerged in the bioreactor. The head pressure of the wastewater on the outside of the submerged membranes provides lower but sufficient differential pressure to drive the wastewater through the membranes and concentrate the biomass in the bioreactor. In some submerged systems the head pressure is supplemented by a suction pump connected to the permeate outlet side to create a higher differential pressure across the membranes.

The solids in the biomass (sometimes called "sludge") build up on and foul the membranes, and the systems must be periodically shutdown and chemically cleaned. The more concentrated the sludge becomes the more often the membranes have to be cleaned. A method of reducing the concentration of sludge flowing through the membrane would alleviate the clogging and greatly reduce the amount of membrane cleaning required and reduce the cost of chemicals used in the process. Increasing the operating time between cleaning operations would also reduce the cost of manpower and increase the useful life of the costly membranes.

The bioreactor is typically a tank or vessel in which biological reduction of organic matter occurs. The tank is aerated to supply oxygen to the bacteria and to help with mixing. Increasing the pressure under which the bioreactor operates also increases the amount of oxygen that can be dissolved in the water. However, the cost of the bioreactor vessel increases dramatically with increased pressure and size.

Aeration is a major problem typically experienced by the entire wastewater treatment industry. Hundreds and perhaps thousands of people are looking for a better way to provide the oxygen required by bacteria in all types of biodegradation processes including those that employ membrane bioreactors. While separation membrane bioreactors typically provide oxygen by bubbling air through the biomass, the present invention brings the bacteria into direct contact with dissolved oxygen by circulating the entire volume of biomass through liquid-gas mixers applied as dissolved gas generators. Either oxygen in air, pure oxygen, or enriched oxygen can be supplied under pressure to the dissolved gas generators by a compressor, bottled oxygen, or membrane separators that enrich the oxygen by removing nitrogen from atmospheric air. Alternately, the dissolved gas generators can also draw oxygen by suction from the atmosphere or from other low-pressure supplies. The use of dissolved oxygen for aeration alleviates the serious problem of foaming typically experienced by bubbling air through the systems.

A need exists worldwide for an improved apparatus and method of providing oxygen to bacteria and reducing sludge fouling of membranes in membrane bioreactor systems.

It will become clear to those skilled in the art having the benefit of this disclosure that the methods and apparatus in accordance with the present invention overcome, or at least greatly minimize, the deficiencies of existing membrane bioreactor apparatus and methods.

SUMMARY OF THE INVENTION

The present invention provides a new method and apparatus for improving biodegradation of organic wastewater contamination in a membrane bioreactor by minimizing the particle size of solids flowing through the membranes to prevent clogging or fouling and by flowing the biomass through a liquid-gas mixer where the liquid containing the bacteria is saturated with dissolved oxygen and the excess un-dissolved gases are removed by the mixer to ensure adequate oxygen for the bacteria before returning to the bioreactor.

An apparatus in accordance with the present invention may generally employ an equalization system to consolidate various streams of wastewater into one with a more consistent flow and level of contamination, a membrane bioreactor system where the biodegradation occurs in a bioreactor vessel with ultrafilters for sidestream filtration to remove excess water and concentrate the biomass, and a controller to monitor and control the process. The apparatus may employ liquid-gas mixers as dissolved gas generations in both the equalization and membrane bioreactor systems to supply dissolved oxygen to the bacteria without bubbling air through the system. A cyclone filter is used to remove suspended solids from the wastewater stream that flows through the ultrafilters to minimize fouling. Where solid particles are large, cyclone filters may also be used in both the equalization and membrane bioreactor systems to remove suspended solids from the wastewater streams that flow through the dissolved gas generators.

One embodiment of the present invention may employ one or more mixers applied as dissolved gas generators and a cyclone filter upstream of each mixer to return the bulk of the solids to the equalization tank and allow only the very fine particles and bacteria flow with the liquid through the mixer and be saturated with dissolved oxygen then returned to the equalization tank through a distributor to be remixed with the solids separated in the cyclone filter. The dissolved oxygen is monitored, and the number of dissolved gas generators needed to maintain the range preset in the controller is placed into operation. The number of dissolved gas generators used depends on the size of the bioreactor system. The pH in the equalization tank is also monitored and adjusted to the range reset inn the controller.

Biomass drawn from the bioreactor vessel is also separated into bulk liquid and bulk slurry streams by a cyclone filter. The bulk slurry stream is returned to the bioreactor vessel. The bulk liquid with only very fine particles and bacteria is pumped through the ultrafilters where some of the wastewater is removed and all solids and bacteria stay in the remaining bulk liquid stream then flows through a dissolved gas generator and is saturated with dissolved oxygen. The bulk liquid stream is then divided downstream of the dissolved gas generator into multiple streams and returned to the bioreactor and mixed with biomass re-circulating from the vessel in a number of mixers dispersed at various levels in the bioreactor vessel.

Dissolved oxygen is monitored and adjusted by the controller as required. Biomass that cannot be consumed by bacteria, such as minerals, is periodically purged from the bioreactor when present.

Another embodiment of the present invention employs one or more dissolved gas generators with all biomass flowing through the dissolved gas generators to be saturated with dissolved oxygen then returned to the equalization tank and dispersed through distributors at various levels in the tank. When the concentration of solids in the incoming streams of wastewater is low, no cyclone filter is needed for water in the equalization tank. The dissolved oxygen is monitored, and the number of dissolved gas generators needed to maintain the range preset in the controller is placed into operation. The number of dissolved gas generators needed in the system depends on the size of the bioreactor system. The pH in the equalization tank is also monitored and adjusted to the range preset in the controller. Biomass drawn from the bioreactor vessel is separated into bulk liquid and bulk slurry streams by a cyclone filter. The bulk slurry stream is returned to the bioreactor vessel. The bulk liquid with only very fine particles and bacteria is pumped through the ultrafilter where some of the water is removed and all solids and bacteria are returned to the bioreactor vessel with the remaining bulk liquid.

Multiple dissolved gas generators may be used for redundancy in order to continue operating the system if one of the mixers fails. With multiple dissolved gas generators the number in operation can be varied to provide the dissolved oxygen needed. Dissolved oxygen is monitored and adjusted by the controller as required. Biomass that cannot be consumed by bacteria, such as minerals, is periodically purged from the bioreactor when present.

Another embodiment of the present invention also employs one or more mixers applied as dissolved gas generators with all biomass flowing through the mixer to be saturated with dissolved oxygen then returned to the equalization tank and dispersed through distributors at various levels in the tank. The dissolved oxygen is monitored, and the number of dissolved gas generators needed to maintain the range preset in the controller is placed into operation. The number of dissolved gas generators needed in the system depends on the size of the bioreactor system. The pH in the equalization tank is also monitored and adjusted to the range preset in the controller. Biomass drawn from the bioreactor vessel is separated into bulk liquid and bulk slurry streams by a cyclone filter. The bulk slurry stream is returned to the bioreactor vessel. The bulk liquid with only fine particles and bacteria flows into a sub tank. Bulk liquid is drawn from the sub tank and pumped through the membrane ultrafilter where some of the water is removed and all solids and bacteria are returned to the bioreactor vessel with the remaining bulk liquid. There are two aeration loops with two mixers employed as dissolved gas generators in each loop. A stream of bulk liquid is drawn from the sub tank and pumped through two mixers in each loop and dispersed through distributors at various levels in the bioreactor vessel.

BRIEF DESCRIPTION OF THE DRAWINGS

FIG. 2A illustrates the horizontal flow of the fluid as it enters the mixer-distributor. FIG. 2B illustrates a vertical cutaway view of the mixer identifying major components and showing the flow of the fluids as they are being mixed.

FIG. 3A illustrates the horizontal flow of the fluid as it enters the cyclone filter. FIG. 3B is a fluid flow diagram illustrating the vertical flow of the fluid through the components of the cyclone filter.

FIG. 4A illustrates the horizontal flow of the fluid as it enters the cyclone filter. FIG. 4B is a fluid flow diagram illustrating the vertical flow of fluid through the components of the cyclone filter.

FIG. 5A illustrates the horizontal flow of the liquid as it enters the fluid mixer and flows through the radial-grooved ring. FIG. 5B illustrates the horizontal flow of the fluid as it enters the fluid mixer and flows through the radial-grooved ring with an orifice ring positioned with the orifice ports over each groove in order to inject a gas into each stream. FIG. 6 is a fluid flow diagram illustrating the vertical flow of fluid through the components of the fluid mixer.

FIG. 11 is a fluid diagram of another embodiment of a membrane bioreactor system employing a cyclone filter to separate large solid particles from the stream flowing through the membrane ultrafilter and multiple fluid mixers applied dissolved gas generators for delivering oxygen to the microorganisms in the bioreactor vessel.

FIG. 17 illustrates the cross section A-A of the membrane of FIG. 16.

DESCRIPTION OF ILLUSTRATIVE EMBODIMENTS

Illustrative embodiments of the invention are described below as they might be employed in the treatment of wastewater using membrane bioreactors. In the interest of clarity, not all features of an implementation are described in this specification. It will of course by appreciated that in the development of any such actual embodiment, numerous implementation-specific decisions must be made to achieve the developers', specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Further aspects and advantages of the various embodiments of the invention will become apparent from consideration of the following description and drawings.

Figure 1:
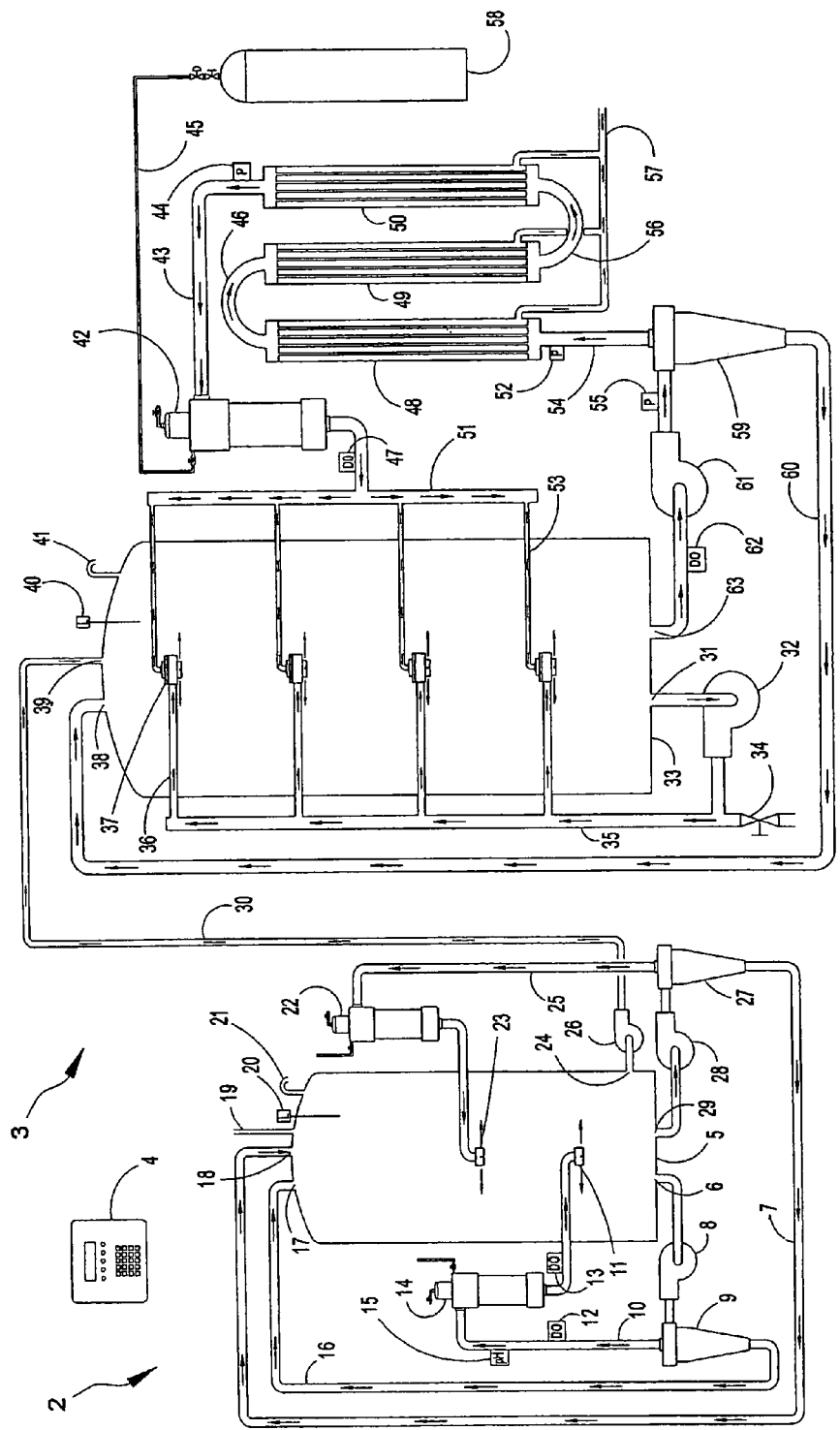
FIG. 1 depicts a schematic representation of a membrane bioreactor system identifying major system component and illustrating the flow pattern through cyclone filters to separate solids from the liquid before flowing through membrane ultrafilters and aerators in accordance with the present invention.

FIG. 1 depicts in schematic illustration a flow diagram of an exemplary membrane bioreactor fluid treatment system 1 for biodegradation of organic contaminants in wastewater in accordance with one embodiment of the present invention. The arrows in the piping indicate the direction of fluid flow. The membrane bioreactor fluid treatment system consists of an equalization system 2 to merge various streams of wastewater and equalize the flow and contaminant level into one stream, a membrane bioreactor system 3 where the biomass is concentrated and most of the biodegradation occurs, and a controller 4 to monitor and control the operation.

The equalization system 2 consists of a wastewater collection tank 5 where various streams of water are consolidated into one biomass. The collection tank 5 is provided with a wastewater inlet 19, a vent 21, and level sensor 20.

There are two systems for supplying dissolved oxygen to promote the activity of the aerobic bacteria in the collection tank 5 and kill anaerobic bacteria to control odor. One of the dissolved oxygen supply systems generally consists of a circulating pump 8, a cyclone filter 9 where the biomass is separated into bulk liquid and bulk slurry streams, a mixer applied as a dissolved gas generator 14, and a distributor 11 to disperse fluid saturated with dissolved oxygen in the collection tank 5. Operation of the cyclone filter 9 and the dissolved gas generator 14 are described in detail in following discussions.

Circulating pump 8 draws biomass from collection tank 5 through outlet port 6 and injects it at high pressure into cyclone filter 9. The biomass is separated in the cyclone filter 9 into a bulk slurry stream that exits the filter as an underflow and a bulk liquid stream as an overflow. The bulk slurry flows out the bottom of the cyclone filter 9 through piping 16 and returns to the collection tank 5 through inlet port 17. The bulk liquid flows out of the top of the cyclone filter 9 through piping 10 and flows into dissolved gas generator 14 where the liquid is saturated with dissolved oxygen and dispersed inside the collection tank 5 through distributor 11.

The second dissolved gas supply system generally consists of a circulating pump 28, a cyclone filter 27 where the biomass is separated into bulk liquid and bulk slurry streams, a mixer applied as a dissolved gas generator 22, and a distributor 23 to disperse the fluid saturated with dissolved oxygen in the collection tank 5. Operation of the cyclone filter 27 and the dissolved gas generator 22 are also described in detail in following discussions.

Circulating pump 28 draws biomass from collection tank 5 through outlet port 29 and injects it at high pressure into cyclone filter 27. The biomass is separated in the cyclone filter 27 into a bulk slurry stream that exits the filter as an underflow and a bulk liquid stream as an overflow. The bulk slurry flows out the bottom of the cyclone filter 27 through piping 7 and returns to the collection tank 5 through inlet port 18. The bulk liquid flows out of the top of the cyclone filter 27 through piping 25 and flows into dissolved gas generator 22 where the liquid is saturated with dissolved oxygen and dispersed inside the collection tank 5 through distributor 23.

The first dissolved gas supply system is installed in the lower part of the collection tank 5 and is the primary supply when the collection tank is not full. A pH sensor 15 installed in piping 10 provides a signal to the controller. The amount of dissolved oxygen in the equalization system 2 is monitored before and after dissolved gas generator 14 by sensors 12 and 13 respectively. The consolidated biomass is pumped out of the collection tank by a pump 26 and transferred to the bioreactor system 3 through piping 30 where it enters the bioreactor through inlet port 39.

The bioreactor system 3 consists generally of bioreactor vessel 33 in which the biodegradation occurs; a cyclone filter 59 for separation of the biomass into bulk liquid and bulk slurry streams; ultrafilter membranes 48, 49, and 50 for removing liquid and concentrating the biomass, a mixer applied as a dissolved gas generator 42 to saturate the liquid with oxygen, mixers 37 to mix the bulk liquid saturated with dissolved oxygen and the biomass from the bioreactor vessel 33 and disperse the mixture into the bioreactor vessel 33, and an oxygen supply 58.

In operation biomass is drawn by pump 61 from the bioreactor vessel 33 through outlet port 63 and injected at high pressure into cyclone filter 59. The biomass is separated in the cyclone filter 59 into a bulk slurry stream that exits the filter as an underflow and a bulk liquid stream that exits the filter as an overflow. The bulk slurry steam flows out the bottom of the cyclone filter 59 through piping 60 and returns to the bioreactor vessel 33 through inlet port 38. The bulk liquid with very fine particles and bacteria flows out the top of the cyclone filter 59 through piping 54 and flows through ultrafilters, 49, 50, and membrane interconnecting piping 46 and 56 and out the ultrafilters through piping 43.

Water removed from the biomass by the ultrafilter is discharged through piping 57. The bulk liquid from piping 43 flows into the dissolved gas generator 42 where it is saturated with oxygen. From the dissolved gas generator 42 the saturated liquid flows through piping manifold 51 where the liquid is divided into four streams and fed into mixers 37 through piping laterals 53. Biomass is drawn by pump 32 from the bioreactor vessel 33 through outlet port 31 and pumped through piping manifold 35 where the biomass is divided and flows into mixers 37 and mixed with the bulk liquid from the dissolved gas generator 42 and dispersed at various levels in the bioreactor vessel 33.

The bioreactor vessel is vented 41 to operate at atmospheric pressure. The level of the biomass is monitor by a level sensor 40. Either oxygen in air, pure oxygen, or enriched oxygen is supplied under pressure to the dissolved gas generator 42 by a compressor (not shown), bottled oxygen 58, or membrane separator to remove nitrogen from atmospheric air (not shown). While membrane bioreactors typically provide oxygen by bubbling air through the biomass, the present invention brings the bacteria into direct contact with dissolved oxygen by circulating the entire volume of biomass through liquid-gas mixers applied as dissolved gas generators. Dissolved oxygen is monitored by a sensor 62 to determine the amount of oxygen in the biomass upstream of pump 61 and a sensor 47 downstream of dissolved gas generator 42. The use of dissolved oxygen for aeration alleviates the serious foaming typically experienced by bubbling air through the systems. A sensor 55 downstream of pump 61, sensor 52 upstream of the ultrafilters, and sensor 44 downstream of the ultrafilters monitor system pressure.

Biomass that cannot be consumed by bacteria, such as minerals, is periodically purged from the system through valve 34.

Figure 2A:
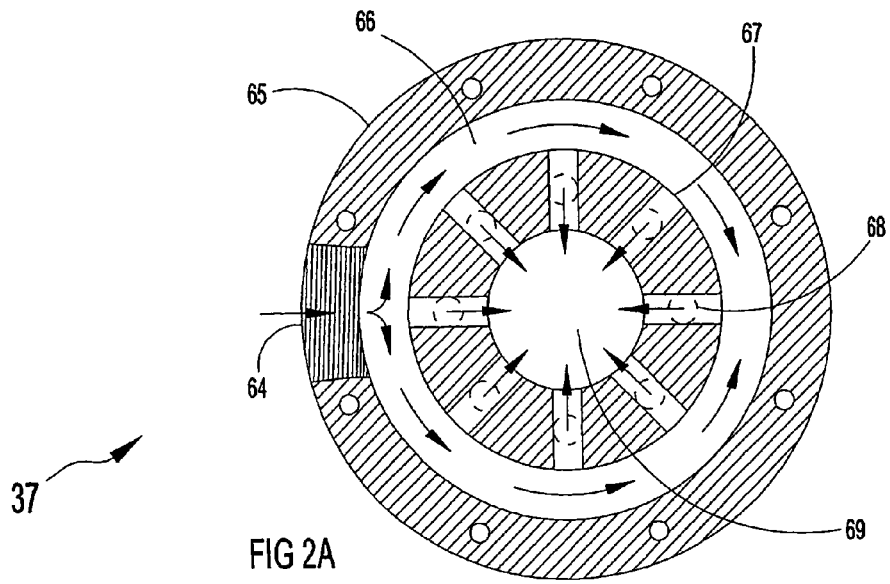
FIGS. 2A and 2B depict a combination mixer and distributor in accordance with the present invention.
Figure 2B:
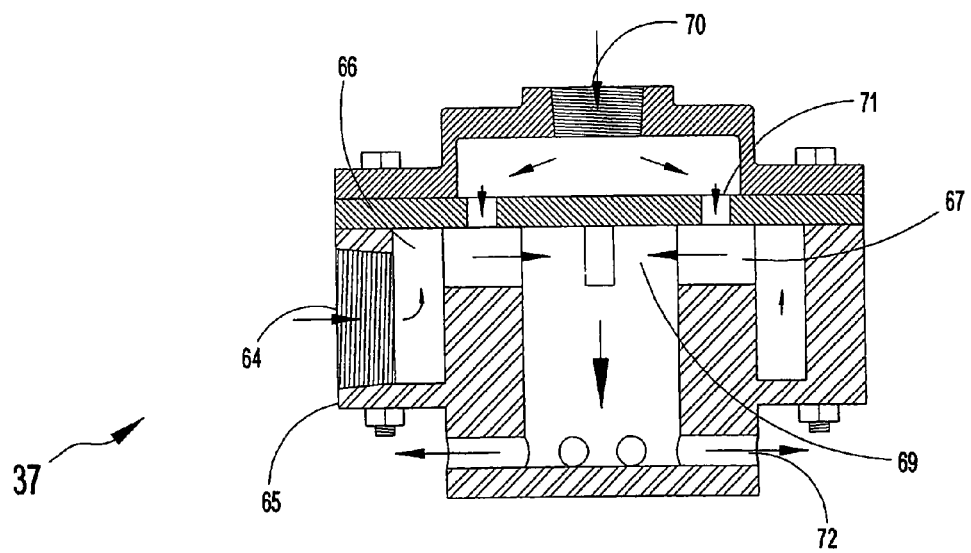

The mixers 37 mix the returning saturated bulk liquid with biomass in the bioreactor vessel. The mixers applied as dissolved gas generators 14, 22, and 42 saturate the fluid with dissolved oxygen to supply the bacteria. The cyclone filters 9, 27, and 59 separate the biomass stream into bulk liquid and bulk slurry streams. The mixers and the cyclone filters may correspond structurally and functionally to the radial-grooved ring mixer and the spiral-grooved ring cyclone filter disclosed in co-pending patent application Ser. No. 09/879,496, filed Jun. 12, 2001, in the name of Johnny Arnaud and assigned to the same assignee as the present application. Mixers 37 are shown in FIGS. 2A and 2B. Cyclone filters 9, 27, and 59 are shown in FIGS. 3A-4B. Mixers 14, 22, and 42 applied as dissolved gas generators are shown in FIGS. 5A-8. While the radial-grooved ring mixers and the cyclone filters are described herein, the foregoing co-depending application is hereby incorporated herein by reference and can be referred to for further structural detail.

FIGS. 2A and 2B illustrate the mixers 37 in the membrane bioreactor vessel 33 of FIG. 1. FIG. 2A depicts a horizontal cross sectional view of the fluid inlet to the fluid mixer 37 illustrating the radial-groove ring 65, the distribution channel 66, the eight radial grooves 67, the position of orifices 68 over the radial grooves 67, and an impact zone 69 to which radial grooves 67 are directed.

FIG. 2B provides a vertical cross sectional view of the fluid mixers 37 assembly consisting of top inlet housing 70, a plate with orifices 71, and radial-grooved ring 65 with and impact zone 69 combined with a lower distributor with multiple outlets 72. The arrows indicate the direction of fluid flow. The saturated bulk fluid from the dissolved gas generator 42 enters the mixer 37 from the top inlet housing 70 and flows through orifices 71 into the radial grooves 67 to be mixed with the biomass. The biomass from the bottom of the bioreactor vessel 33 enters the mixer through inlet 64, flows around the distribution channel 66, and is injected at high velocity through the radial grooves 67 and mixed with the saturated bulk fluid entering from the orifices 71 and into the impact zone 69. The biomass mixed with saturated bulk fluid is dispersed into the bioreactor vessel 33 by the multiple outlets 72.

Figure 3A:
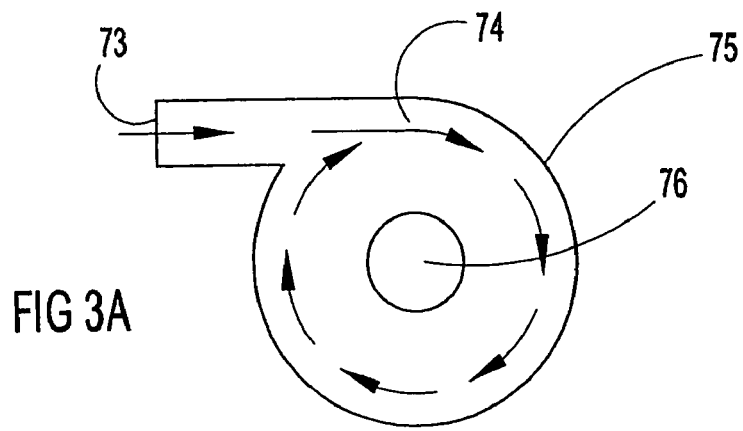
FIGS. 3A and 3B are schematics illustrating a typical cyclone filter.
Figure 3B:
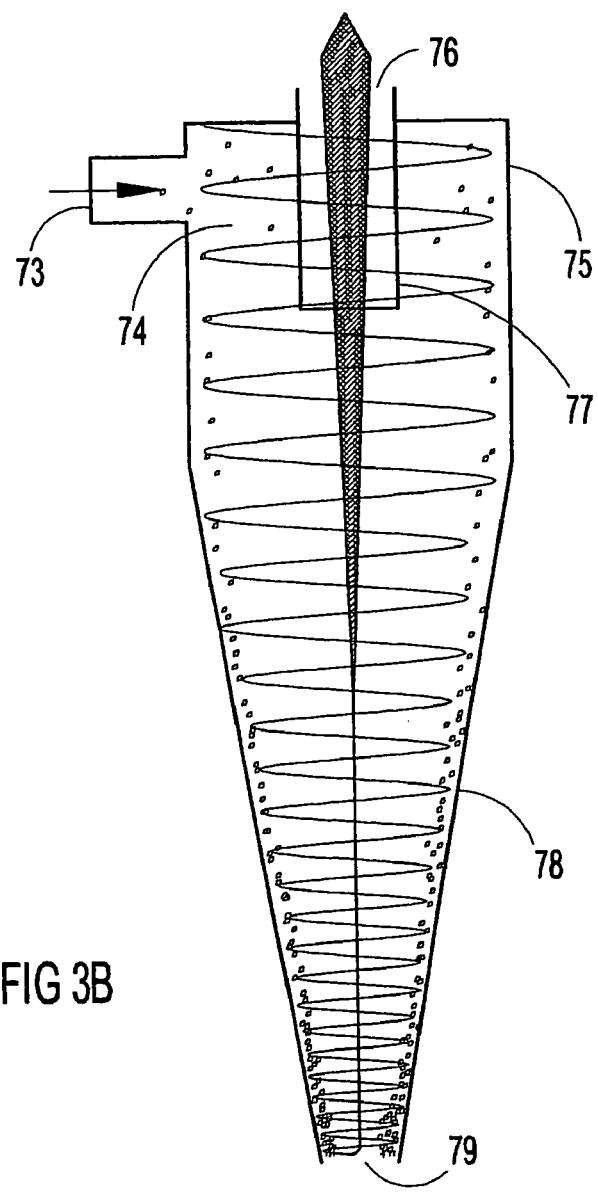

FIGS. 3A and 3B are schematics illustrating a typical cyclone filter. FIG. 3A illustrates the horizontal flow at the inlet 73 of an existing cyclone filter that may be used to separate suspended solids from wastewater by using centrifugal force. FIG. 3B illustrates the vertical flow through the components of the filter. The arrows indicate the direction of flow.

The general features of this type of conventional cyclone filter include an inlet 73, a vertical cylinder 75 in which water can circulate, a lower cone 78, a sludge outlet 79 sometimes referred to as an orifice, and a short outlet cylinder 77 sometimes referred to as a vortex finder with the inside of the vortex finder 77 serving as the fluid outlet 76. Water containing the solid particles to be removed enters the filter through inlet 73 at the velocity selected for the specific size of the filter and injected as a single jet into the filter tangent into the diameter of the cylinder 75. The injected water causes the water 74 inside the filter to circulate creating a centrifugal force that moves the suspended solid particles to the outside diameter of the filter housing as it spirals downward and causes a low pressure in the center of the circulating stream. The water flow reverses and flows up the center of the circulating stream and out the filter though outlet 76 in the vortex finder 77. The solid particles collect in the lower section of the cone 78 and flow out of the filter through the sludge outlet 79.

Figure 4A:
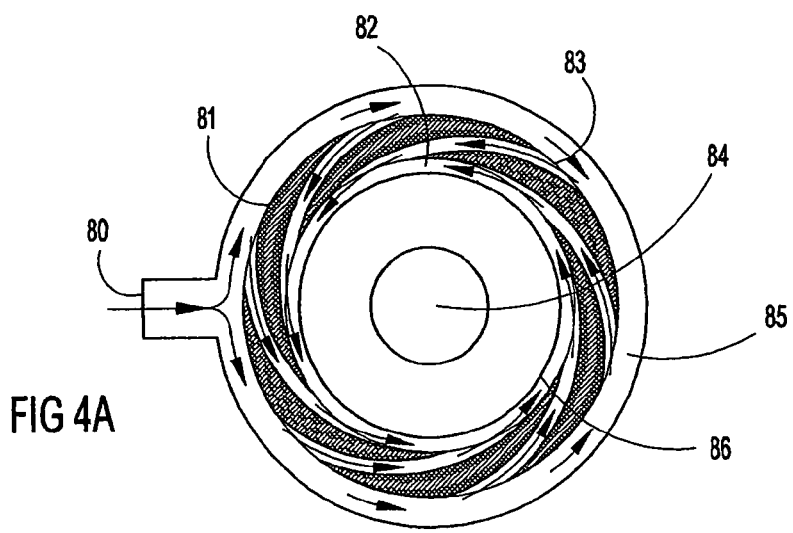
FIGS. 4A and 4B are fluid diagrams of a cyclone filter employing a spiral-grooved ring mounted on the outside of the housing to divide the entering fluid and inject the fluid in high velocity multiple streams into and at a tangent to a cylinder above the cone shaped housing.
Figure 4B:
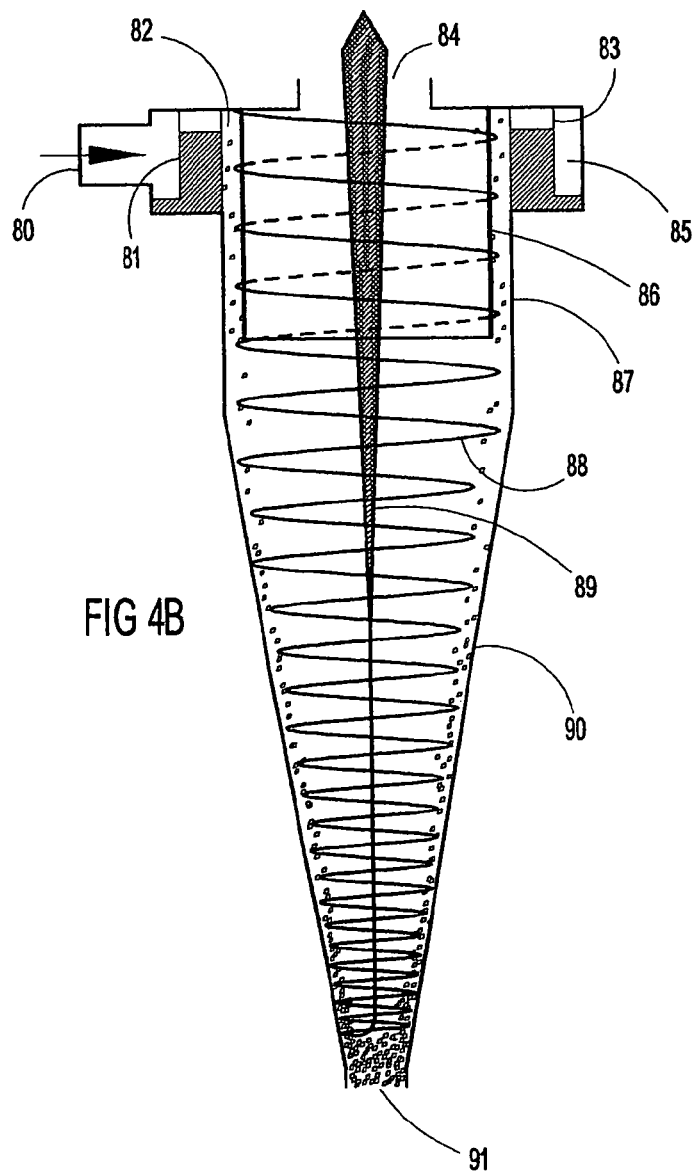

FIGS. 4A and 4B illustrate a type of spiral-grooved ring cyclone filter 9, 27, or 59 that may be used to separate the biomass stream into bulk liquid and bulk slurry streams. The cyclone filter consists of an inlet 80, a distribution channel 85, a spiral-grooved ring 81 with multiple grooves 83, a cylinder 87 serving as an outer diameter of a down-flow annulus 82, an inner short cylinder or short skirt 86 serving as the inside diameter of the down-flow annulus 82, a lower cone 90, a cone outlet 91 for discharging solid particles separated from the fluid, and a fluid outlet 84.

FIG. 4A illustrates the horizontal flow of the fluid as it enters the cyclone filter 9, 27, or 59. FIG. 4B illustrates the vertical flow pattern of the fluid through the components of the filter. The arrows indicate the direction of fluid flow. Fluid enters the cyclone filter 9, 27, or 59 through inlet 80 and flows into the distribution channel 85 in both directions around the outside of the spiral-grooved ring 81. The fluid from the distribution channel 85 is divided and flows into six spiral grooves 83 where its velocity is increased then injected into a narrow down-flow annulus 82. The down-flow annulus 82 allows the fluid to be injected at a velocity much higher than filters with no annulus 82 without interfering with the outgoing fluid. The fluid flows downward in a spiral motion 88. The circulating fluid causes a vortex 89 to form at the low-pressure center. As the fluid flows down the lower cone 90 it is forced to the center and upward through the outlet 84. With the inner skirt 86 dividing the incoming and outgoing fluids, the outlet 84 can be much larger without the need for a vortex finder. Solid particles separated from the fluid are discharged through the outlet 91 into a collection chamber (not shown) or other receptacle.

Figure 5A:
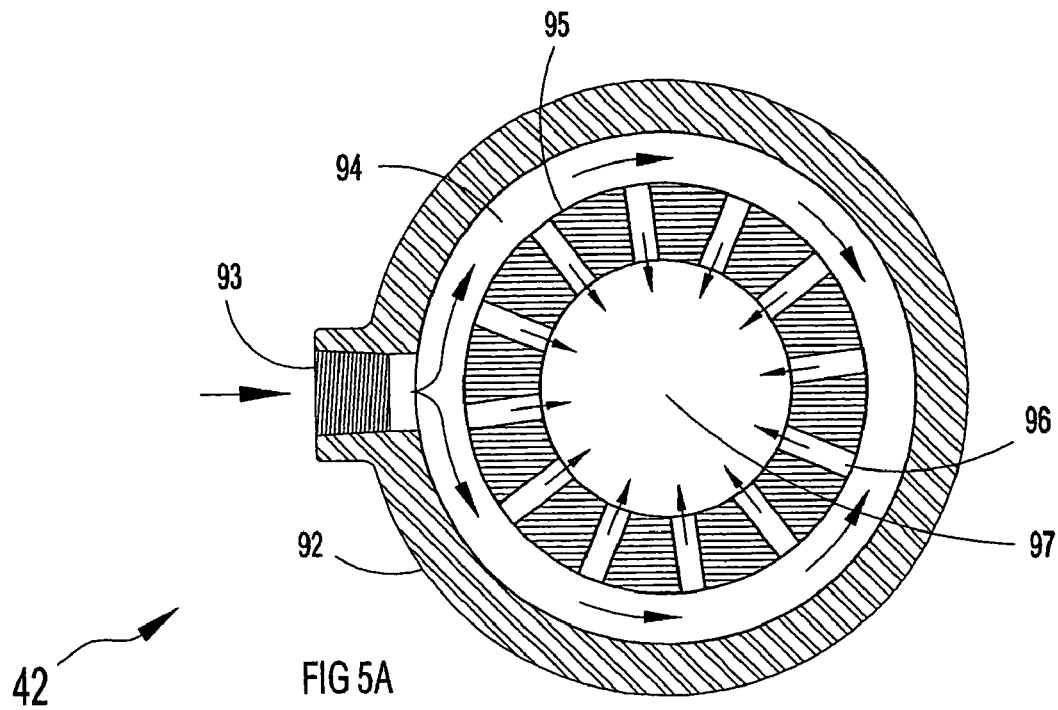
FIGS. 5A, 5B, and 6 are fluid diagrams of a fluid mixer used as a dissolved gas generator employing a radial-grooved ring, an orifice ring positioned with the orifice ports over each groove in order to inject a gas into each stream, and an impact zone for saturating liquids with dissolved gases.
Figure 5B:
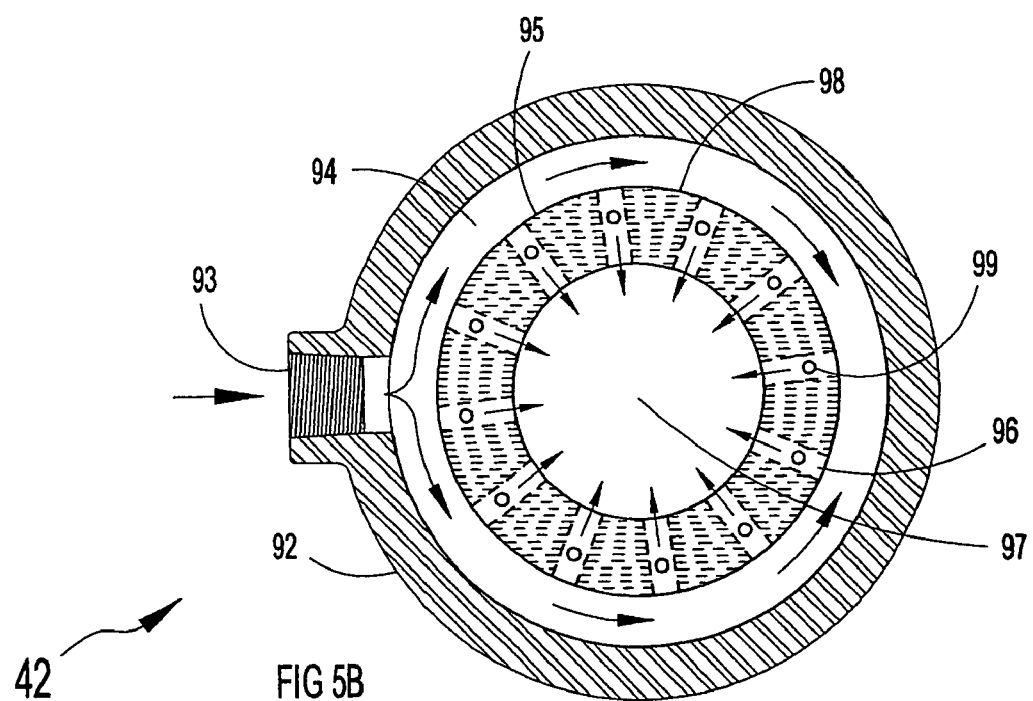
Figure 6:
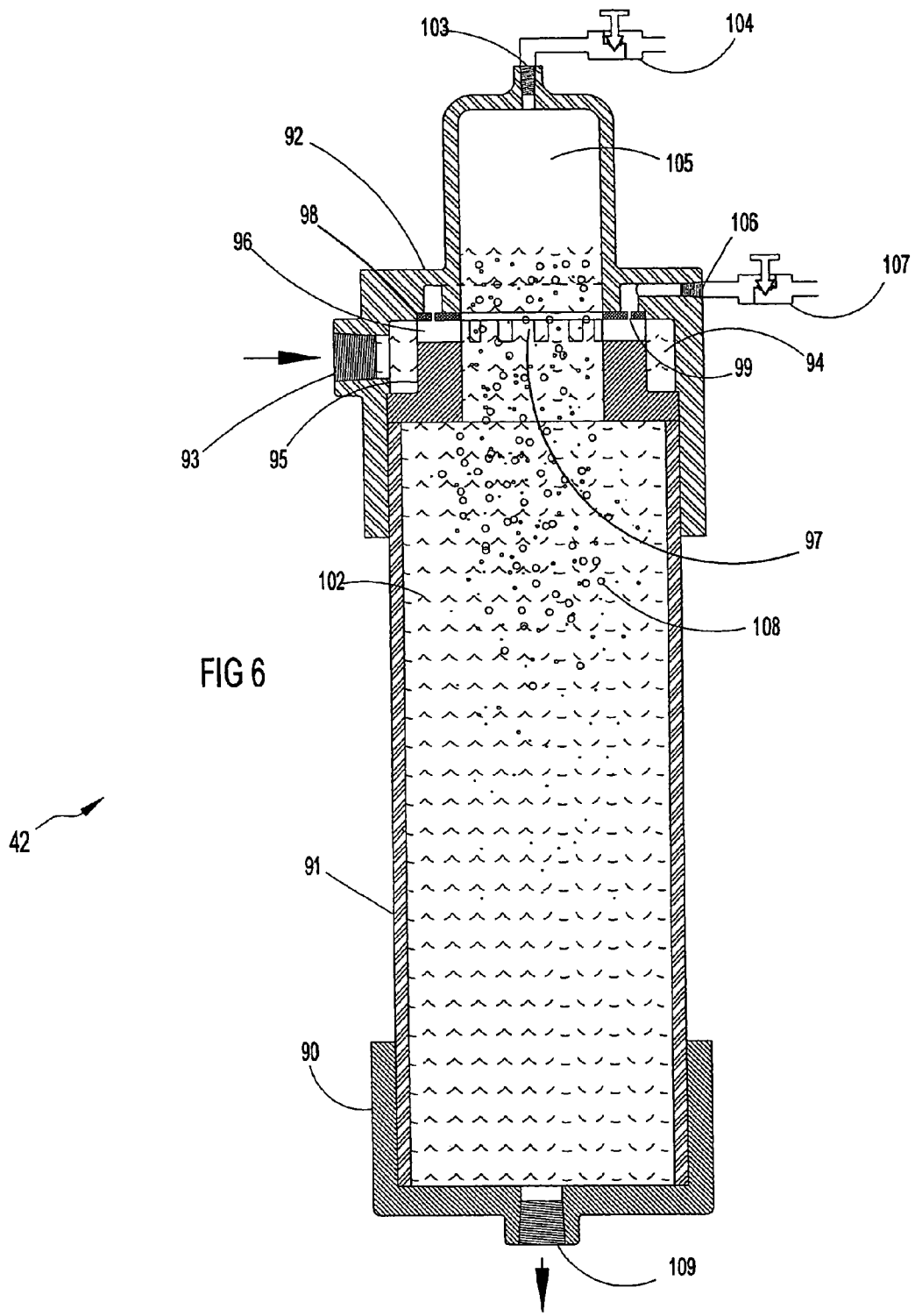

FIGS. 5A-6 depict a fluid mixer applied as a dissolved gas generator 42 employing the dynamic forces of fluid flow obtained with a radial-grooved ring where pressurized gas is used as an oxygen supply 58. FIG. 5A depicts a horizontal cross sectional view of the liquid inlet to the dissolved gas generator 42 illustrating the donut housing 92 with the inlet 93, the distribution channel 94, the radial-grooved ring 95 with 8 radial grooves 96, and an impact chamber 97 or zone to which the radial grooves 96 are directed.

FIG. 5B also provides a horizontal cross sectional view of the dissolved gas generator 42 with an orifice ring 98 positioned with the orifice ports 99 over the radial-grooves 96. The arrows indicate the direction of fluid flow. FIG. 6 provides a vertical cross sectional view of the fluid mixer 96 assembly consisting of a cylindrical donut housing 92, an orifice ring 98, a radial-grooved ring 95, a lower cylinder 91, and a lower cap 90. The cylindrical donut housing 92 has a gas separation chamber 105 to separate excess gases from the liquids so the gases can be discharged while retaining the liquid.

The center of the radial-grooved ring 95 serves as an impact zone 97 into which the multiple streams of the liquid-gas mixture flowing at high velocity are directed to collide with each other. An inlet gas-metering valve 107 connected to the gas inlet 106 of the cylindrical donut housing 92 regulates the amount of gas supplied during operation. An outlet gas-metering valve 104 connected to the gas outlet 103 of the cylindrical donut housing 92 regulates the amount of gas discharged from the device during operation.

Referring to FIG. 5B, the arrows indicate the direction of liquid flow. The liquid enters the fluid mixer 42 through the inlet 93 and flows into the distribution channel 94 in both directions around the radial-grooved ring 95. The liquid is divided and flows into the radial grooves 96 under the orifice ring 98 where gas is injected into each of the high velocity streams. The liquid-gas mixture in each groove is then injected into the impact zone 97.

Referring to FIG. 6, again the liquid enters through inlet 93 and flows into the distribution channel 94 around the radial-grooved ring 95. The liquid then flows through the radial grooves 96 where gas is injected through the orifice ports 99 into each liquid stream. The liquid-gas mixture in each of the grooves 96 is then injected at high velocity into the impact zone 97 to collide with each other. The liquid becomes saturated with gas at this point. The inlet gas-metering valve 107 regulates the amount of gas supplied.

The saturated liquid 102 flows downward out of the impact zone 97 and into the larger area of the lower cylinder 91 where the velocity is decreased. The excess gas bubbles 108 flow upward and return to the impact zone 97. The saturated liquid 102 continues to flow downward and exits through the outlet 109. The excess bubbles flow up through the impact zone 97, and the gas is separated from the liquid in the separation chamber 105 and released from the unit through the outlet gas-metering valve 104.

The amount of gas retained in the separation chamber 105 regulates the liquid level in the apparatus. The amount of gas released is adjusted to maintain the liquid level just above the impact zone 97, and only a small amount of gas has to be released from the chamber 105. The fluid mixer 42 is extremely effective at saturating liquid with gas with only five parts that can be manufactured in many sizes at low cost. It can be manufactured in metal or in plastic either machined or injected molded.

Figure 7A:
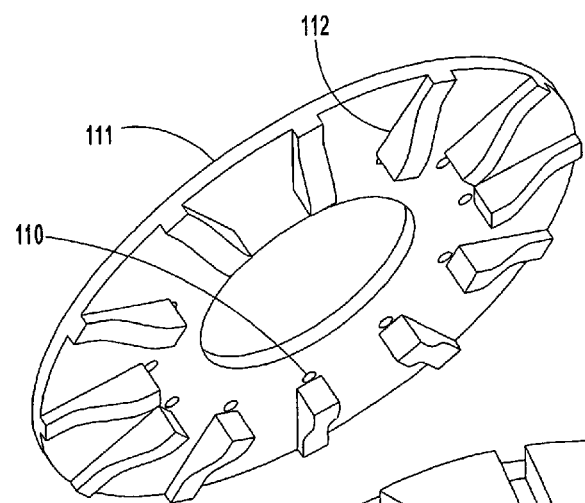
FIGS. 7A and 7B provide three-dimensional illustrations of a typical radial-grooved ring and a combination venturi-orifice ring used in the fluid mixer.
Figure 7B:
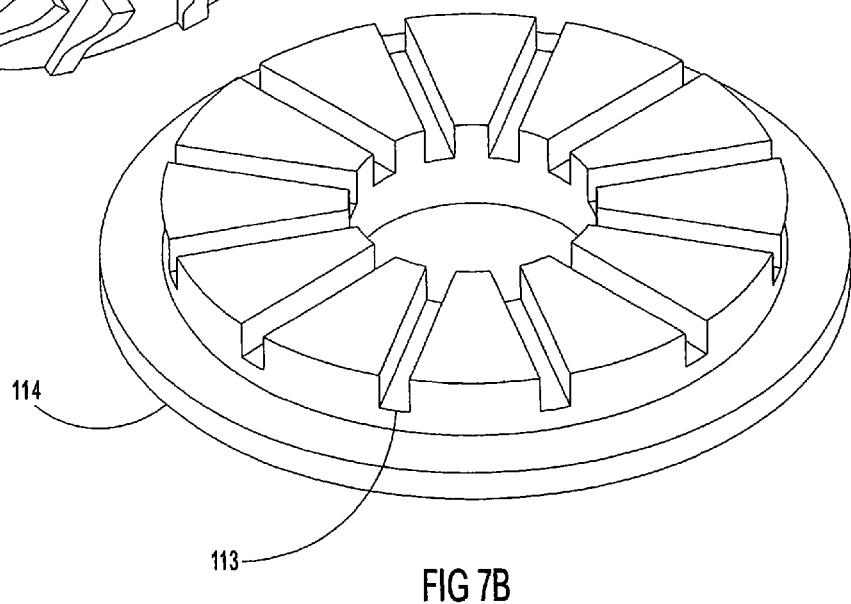
Figure 8:
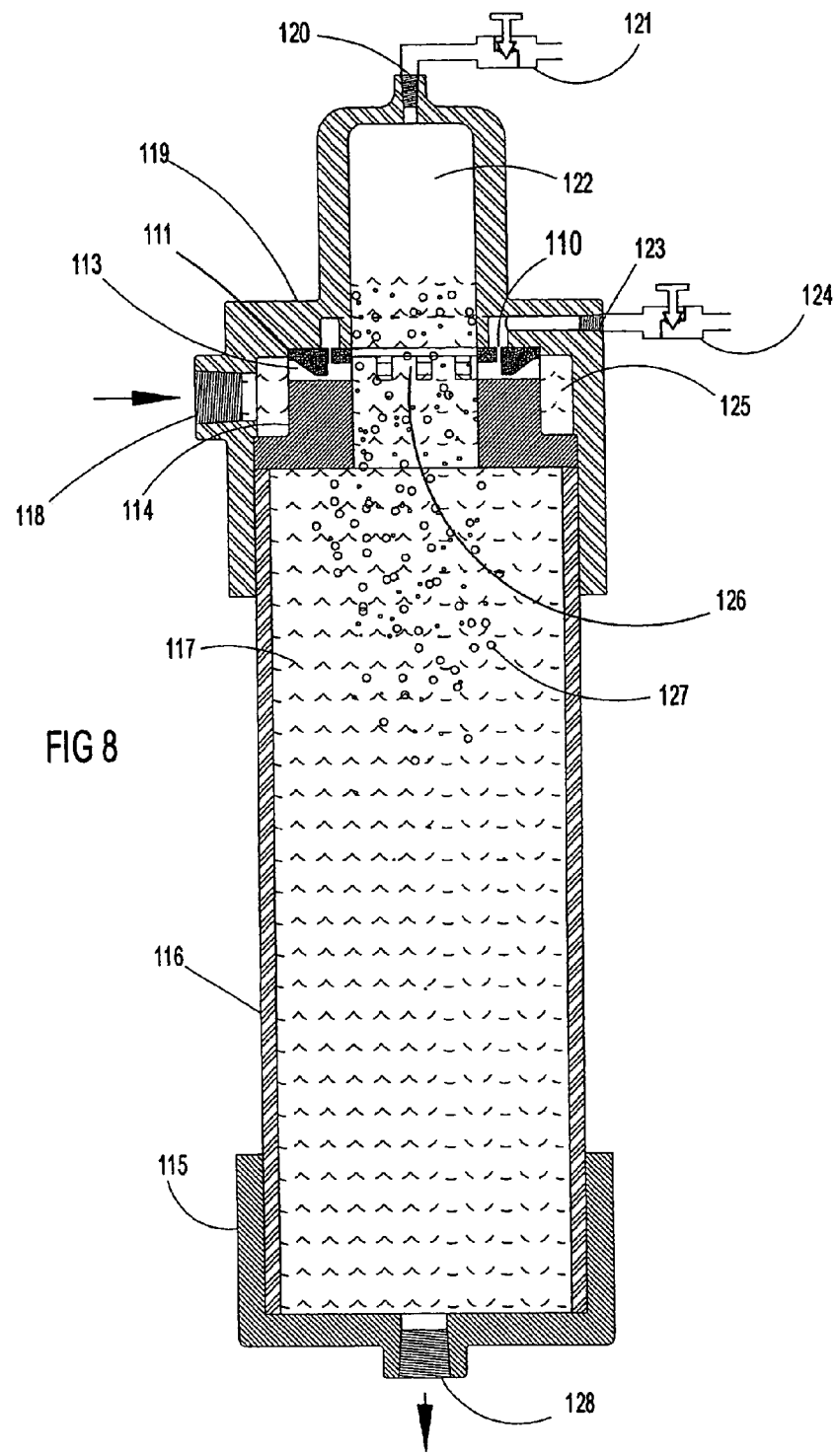
FIG. 8 is a fluid diagram of fluid mixer employing a radial-grooved ring; a combination venturi-orifice ring positioned with the venturi and orifice ports in each groove in order to draw a second fluid into each stream, and an impact zone for mixing the various fluids.

FIGS. 7A-8 depict a fluid mixer applied as a dissolved gas generator 14 and 22 employing dynamic forces of fluid flow obtained with a radial-grooved ring where atmospheric air or other low pressure gas is used as an oxygen supply and drawn into the mixer by venturi suction. FIGS. 7A and 7B provide three-dimensional illustrations of a typical radial-grooved ring 114 and a combination venturi-orifice ring 111 having 12 orifices 110 and 12 venturi 112 to fit into the radial grooves 113 of the radial-grooved ring 114.

FIG. 8 provides a vertical cross-sectional view of the fluid mixer 14 and 22 assembly consisting of a cylindrical donut housing 119, a combination venturi-orifice ring 111, a radial-grooved ring 114, a lower cylinder 116, and a lower cap 115. The cylindrical donut housing 119 has a gas separation chamber 122 to separate excess gases from the liquids so the gases can by discharged while retaining the liquid. The center of the radial-grooved ring 114 serves as an impact zone 126 into which the multiple streams of the liquid-gas mixture flowing at high velocity are directed to collide with each other. An inlet gas-metering valve 124 connected to the gas inlet 123 of the cylindrical donut housing 119 regulates the amount of gas supplied during operation. An outlet gas-metering valve 121 connected to the gas outlet 120 of the cylindrical donut housing 119 regulates the amount of gas discharged from he device during operation.

Referring to FIG. 8, the liquid enters through inlet 118 and flows into the distribution channel 125 around the radial-grooved ring 114. The liquid then flows through the radial grooves 113 where gas is drawn through the orifice ports 110 into each liquid stream as the liquid flows by the venturi. The liquid-gas mixture in each of the grooves 113 is then injected at high velocity into the impact zone 126 to collide with each other. The liquid becomes saturated with gas at this point. The inlet gas-metering valve 124 regulates the amount of gas supplied.

The saturated liquid 117 flows downward out of the impact zone 126 and into the larger area of the lower cylinder 116 where the velocity is decreased. The excess gas bubbles 127 flow upward and return to the impact zone 126. The saturated liquid continues to flow downward and exits through the outlet 128. The excess bubbles flow up through the impact zone 126, and the gas is separated from the liquid in the separation chamber 122 and released from the unit through the outlet gas-metering valve 121.

The amount of gas retained in the separation chamber 122 regulates the liquid level in the apparatus. The amount of gas released is adjusted to maintain the liquid level just above the impact zone 126, and only a small amount of gas has to be released from the chamber 122. The fluid mixer 14 and 22 is extremely effective at saturating liquids with gases with only five parts that can be manufactured in many sizes at low cost. It can be manufactured in metal or in plastic either machined or injected molded.

Figure 9:
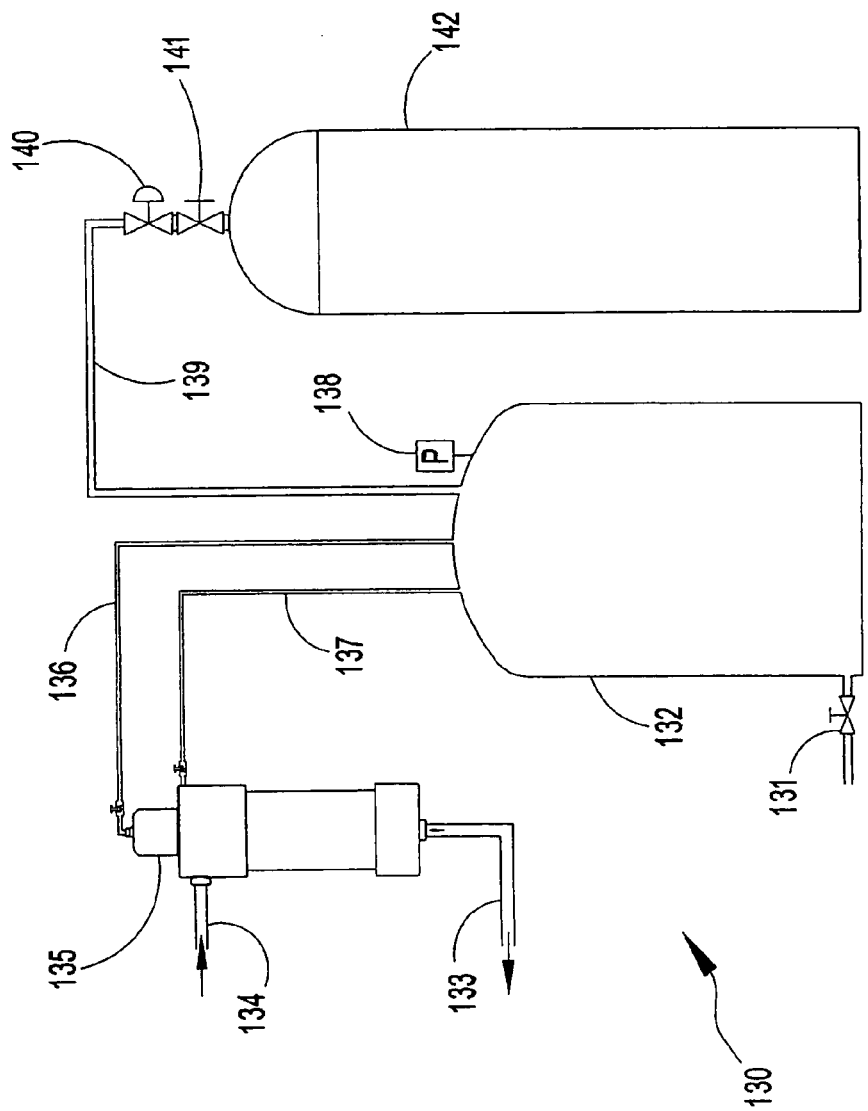
FIG. 9 is a schematic illustration of an aeration system for supplying pure oxygen and recycling any excess pure oxygen supplied to a membrane bioreactor system.

FIG. 9 provides a schematic illustration of an aeration system, or sub system, 130 for a membrane bioreactor that supplies pure oxygen for saturation of the biomass and recycles the excess oxygen discharged from the mixer without releasing any of the oxygen to the atmosphere.

The aeration system 130 consists generally of a mixer with a combination venturi-orifice ring applied as a dissolved gas generator 135, a pure oxygen supply 142 with a shutoff valve 141 and a pressure regulator 140, a low-pressure storage tank 132, and associated piping. In operation, biomass from the membrane bioreactor system (not shown) enters the dissolved gas generator 135 under pressure through inlet line 134 and flows through the dissolved gas generator 135 where the biomass is saturated with pure oxygen and exits through the outlet line 133. As the biomass flows passed the venturi in the dissolved gas generator 135, pure oxygen is drawn from the low-pressure storage tank 132 through the gas supply line 137 and saturates the biomass as described in the discussion of FIG. 8. The excess pure oxygen released from the dissolved gas generator 135 is returned to the low-pressure tank 132 through outlet line 136. Only a small percentage of the pure oxygen used to saturate the biomass is discharged from the dissolved gas generator 135 and returned to the low-pressure tank 132. The pure oxygen supply 142 maintains the pressure preset by the pressure regulator 140 as indicated by pressure gage 138 in the low-pressure tank 132. Moisture that accumulates in the low-pressure tank is discharged through drain valve 131. Only the oxygen needed to supply the bacteria is consumed by this aeration system 130 making it feasible to use pure oxygen in many membrane bioreactor systems.

Figure 10:
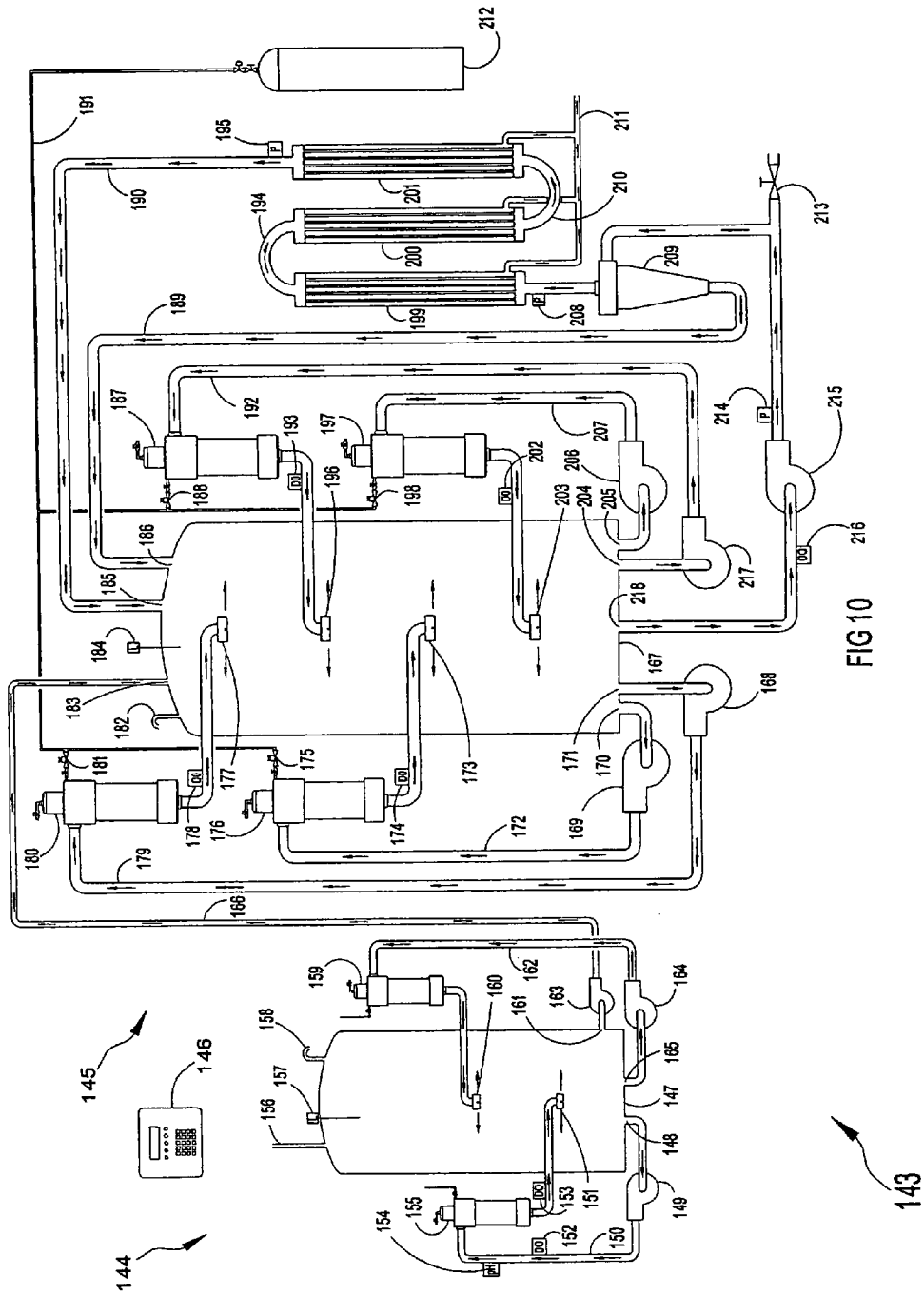
FIG. 10 is a fluid diagram of another embodiment of a membrane bioreactor system employing a cyclone filter to separate large solid particles from the stream flowing through the membrane ultrafilter and multiple fluid mixers applied as dissolved gas generators for delivering oxygen to the microorganisms in both the equalization and bioreactor tanks, also with cyclone filter pretreatment.

FIG. 10 depicts a schematic illustration of another embodiment of a membrane bioreactor fluid treatment system 143 for biodegradation of organic contaminants in wastewater in accordance with one embodiment of the present invention. The arrows in the piping indicate the direction of fluid flow. The membrane bioreactor fluid treatment system 143 consists of an equalization system 144 to merge various streams of wastewater and equalize the flowrate and contaminant level into one stream, a membrane bioreactor system 145 where the biomass is concentrated and biodegradation occurs, and a controller 146 to monitor and control the operation.

The equalization system 144 consists of a wastewater collection tank 147 where various streams of water are consolidated into one biomass. The collection tank 147 is provided with a wastewater inlet 156, a vent 158, and level sensor 157.

There are two systems for supplying dissolved oxygen to promote the activity of the aerobic bacteria in the collection tank 147 and kill anaerobic bacteria to control odor. The first dissolved gas supply system in installed in the lower part of the collection tank 147 and is the primary supply when the collection tank is not full. The first dissolved oxygen supply system generally consists of a circulating pump 149, a mixer applied as a dissolved gas generator 155, and a distributor 151 to disperse the fluid saturated with dissolved oxygen in the collection tank 147.

Operation of the dissolved gas generator 155 is described in detail in the discussion of FIG. 8. Circulating pump 149 draws biomass from collection tank 147 through outlet port 148 and pumps it through piping 150 into dissolved gas generator 155 where the liquid is saturated with dissolved oxygen and disperse inside the collection tank 147 through distributor 151. A pH sensor 154 installed in piping 150 provides a signal to the controller 146. The amount of dissolved oxygen in the equalization system 144 is monitored before and after dissolved gas generator 155 by sensors 152 and 153 respectively.

The second dissolved gas supply system generally consists of a circulating pump 164, a mixer applied as a dissolved gas generator 159, and a distributor 160 to disperse the fluid saturated with dissolved oxygen in the collection tank 147. Operation of the gas generator 159 is described in detail in the discussion of FIG. 8. Circulating pump 164 draws biomass from collection tank 147 through outlet port 165 and pumps it through piping 162 and into dissolved gas generator 159 where the liquid is saturated with dissolved oxygen and disperse inside the collection tank 147 through distributor 160. The consolidated biomass is pumped out of the collection tank 147 by a pump 163 and transferred to the membrane bioreactor system 145 through piping 166 where it enters the bioreactor vessel 167 through inlet port 183.

The membrane bioreactor system 145 consists generally of bioreactor vessel 167 in which the biodegradation occurs, four aeration sub systems to supply dissolved oxygen to the bacteria, and an ultrafilter sub system to concentrate the biomass in the bioreactor vessel 167 by removing some of the liquid and retaining all suspended solids including bacteria.

The bioreactor vessel 167 is sized to provide the retention time needed for biodegradation of the specific organic contaminants in the wastewater to be treated. The retention time required may typically vary from 6 to 24 hours, again, depending on the organic contaminants in the wastewater. The bioreactor vessel 167 is vented 182 to operate at atmospheric pressure. A level sensor 184 monitors the level of the biomass in the reactor vessel 167.

The four aeration systems are positioned to distribute the saturated biomass at various levels when saturated with oxygen and returned to the bioreactor vessel 167. The first aeration sub system installed at the lowest level in the bioreactor vessel 167 generally consists of a pump 206, a mixer applied as a dissolved gas generator 197, a gas shutoff valve 198, a distributor 203, and associated piping.

Operation of the dissolved gas generator 197 is described in detail in the discussions of FIGS. 5A-6. Circulating pump 206 draws biomass from the bioreactor vessel 167 through outlet port 205 and pumps it through piping 207 into dissolved gas generator 197 where the liquid is saturated with dissolved oxygen and dispersed inside the bioreactor vessel 167 through distributor 203.

The second aeration sub system installed at the second level in the bioreactor vessel 167 generally consists of a pump 169, a mixer applied as a dissolved gas generator 176, a gas shutoff valve 175, a distributor 173, and associated piping. Operation of the dissolved gas generator 176 is described in detail in the discussions of FIGS. 5A-6. Circulating pump 169 draws biomass from the bioreactor vessel 167 through outlet port 170 and pumps it through piping 172 into dissolved gas generator 176 where the liquid is saturated with dissolved oxygen and dispersed inside the bioreactor vessel 167 through distributor 173.

The third aeration sub system installed at the third level in the bioreactor vessel 167 generally consists of a pump 217, a mixer applied as a dissolved gas generator 187, a gas shutoff valve 188, a distributor 196, and associated piping. Operation of the dissolved gas generator 187 is described in detail in the discussions of FIGS. 5A-6. Circulating pump 217 draws biomass from the bioreactor vessel 167 through outlet port 204 and pumps it through piping 192 into dissolved gas generator 187 where the liquid is saturated with dissolved oxygen and dispersed inside the bioreactor vessel 167 through distributor 196.

The fourth aeration sub system installed at the fourth level in the bioreactor vessel 167 generally consists of a pump 168, a mixer applied as a dissolved gas generator 180, a gas shutoff valve 181, a distributor 177, and associated piping. Operation of the dissolved gas generator 180 is described in detail in the discussions of FIGS. 5A-6. Circulating pump 168 draws biomass from the bioreactor vessel 167 through outlet port 171 and pumps it through piping 179 into dissolved gas generator 180 where the liquid is saturated with dissolved oxygen and dispersed inside the bioreactor vessel 167 through distributor 177.

The operation of the four aeration systems is monitor and controlled by the controller 146. Oxygen is supplied by the gas supply 212 as air by a compressor (not shown), as pure oxygen, or as enhanced oxygen by a nitrogen removal membrane (not shown). The sensor 216 located in the line upstream of pump 215 monitors the amount of dissolved oxygen in the biomass as it flows out of the bioreactor vessel 167 and is used by the controller 146 to determine the amount of dissolved oxygen remaining in the volume of biomass in the reactor vessel 167. Sensors 174, 178, 193, and 202 monitor the amount of dissolved oxygen in the biomass as it flows out of each dissolved gas generator 176, 180, 187, and 197 and is used by the controller to determine the amount of dissolved oxygen being added to the biomass in the reactor vessel 167. By comparing the amount of dissolved oxygen remaining in the biomass in the bioreactor vessel 167 and the amount being added by the dissolved gas generators the controller can regulator the total amount of dissolved oxygen in the biomass to within a range preset in the controller 146 and startup or shutdown individual dissolved gas generators by turning the associated circulating pumps 168, 169, 206, or 217 on or off and opening or closing the corresponding gas supply valves 175, 181, 188, or 198. The use of dissolved oxygen for aeration alleviates the serious problem of foaming typically experienced by bubbling air through the systems.

The ultrafilter sub system consists generally of a circulating pump 215; a cyclone filter 209 for separation of the biomass into bulk liquid and bulk slurry streams; ultrafilters 199, 200, and 201 for removing liquid and concentrating the biomass; and associated piping. In operation biomass is drawn by pump 215 from the bioreactor vessel 167 through outlet port 218 and injected at high pressure into cyclone filter 209. The biomass is separated in the cyclone filter 209 into a bulk slurry stream that exits the filter as an underflow and a bulk liquid stream that exits the filter as an overflow. The bulk slurry stream flows out the bottom of the cyclone filter 209 through piping 189 and returns to the bioreactor vessel 167 through inlet port 186.

The bulk liquid with very fine particles and bacteria flows out the top of the cyclone filter 209 and flows through ultrafilters 199, 200, 201, and membrane interconnecting piping 194 and 210 and out the ultrafilters through piping 190. Water removed from the biomass by the ultrafilters is discharged through piping 211. The bulk liquid from piping 190 is returned to the bioreactor vessel 167 through inlet port 185. Sensor 214 downstream of pump 215, sensor 208 upstream of the ultrafilter 199, and sensor 195 downstream of the membrane ultrafilter 201 monitor the system pressure. From the pressures the performance of the ultrafilters 199, 200, and 201 can be determined and used as an indication of when they need to be cleaned.

Biomass that cannot be consumed by bacteria, such as minerals, is periodically purged from the system through valve 213.

FIG. 11 depicts a schematic illustration of another embodiment of a membrane bioreactor fluid treatment system 219 for biodegradation of organic contaminants in wastewater in accordance with one embodiment of the present invention. The arrows in the piping indicate the direction of fluid flow. The membrane bioreactor fluid treatment system consists of an equalization system 144 to merge various streams of wastewater and equalize the flowrate and contaminant level into one stream, a membrane bioreactor system 221 where the biomass is concentrated and biodegradation occurs, and a controller 222 to monitor and control the operation. The equalization system 144 is the same equalization system 144 as the one in the membrane bioreactor fluid treatment system 143 illustrated in FIG. 10 and incorporated here by reference to the FIG. 10 discussions.

The membrane bioreactor system 221 consists generally of bioreactor vessel 223 in which the biodegradation occurs, an aeration system to supply dissolved oxygen and saturate the bulk liquid with pure oxygen to promote activity of the bacteria, a biomass separation sub system to divide the biomass into bulk slurry and bulk liquid streams, and an ultrafilter sub system to concentrate the biomass in the bioreactor vessel 223 by removing some of the liquid and retaining all suspended solids including bacteria. Using pure oxygen increases the saturation concentration by approximately 4.7 times that available by using air.

The bioreactor vessel 223 is sized to provide the retention time needed for biodegradation of the specific organic contaminants in the wastewater to be treated. The retention time required may typically vary from 6 to 24 hours, again, depending or the organic contaminants in the wastewater. The bioreactor vessel 223 is vented 233 to operate at atmospheric pressure. A level sensor 235 monitors the level of the biomass in the reactor vessel 223.

The biomass separation sub system consists generally of a pump 250, a cyclone filter 256, a bulk liquid storage tank 258, and associated piping. In operation biomass is drawn by pump 250 from the bioreactor vessel 223 through outlet port 248 and injected at high pressure into the cyclone filter 256. The biomass is separated in the cyclone filter 256 into a bulk slurry stream that exits the filter as an underflow and a bulk liquid stream that exits the filter as an overflow. The bulk slurry stream flows out the bottom of the cyclone filter 256 through piping 257 and returns to the bioreactor vessel 223 through inlet port 237. The bulk liquid with very fine particles and bacteria flows out the top of the cyclone filter 256 and flows into a bulk liquid storage tank 258 to be used in the aeration and ultrafilter sub systems.

The aeration system consists of two aeration sub systems with two pumps and four mixers each and a pure oxygen supply and recycling sub system. The first aeration sub system consists generally of a pump 252, two mixers applied as dissolved gas generators 229 and 231, and associated piping. In operation bulk liquid is drawn by pump 252 from the bulk liquid storage tank 258 through outlet port 268 and pumped through piping 224 to dissolved gas generators 229 and 231 where the bulk liquid is saturated with pure oxygen and dispersed into the bioreactor vessel 223 through distributor 225 from dissolved gas generator 229 and through distributor 228 from dissolved gas generator 231. The second aeration sub system consists generally of a pump 253, two mixers applied as dissolved gas generators 238 and 241, and associated piping. In operation bulk liquid is drawn by pump 253 from the bulk liquid storage tank 258 through outlet port 254 and pumped through piping 246 to dissolved gas generators 238 and 241 where the bulk liquid is saturated with pure oxygen and dispersed into the bioreactor vessel 223 through distributor 242 from dissolved gas generator 238 and through distributor 245 from dissolved gas generator 241.

The pure oxygen supply and recycling sub system supplies pure oxygen to the mixers used as dissolved gas generators 229, 231, 238, and 241 for saturation of the bulk liquid as it flows through the mixers and recycles the excess oxygen discharged from the mixers without releasing any of the oxygen to the atmosphere. The pure oxygen supply and recycling sub system consists of a pure oxygen supply 283 with a pressure regulator 282, a low-pressure storage tank 267, shut-off valves 227, 232, 239, and 243 at the dissolved gas generators 229, 231, 238, and 241 respectively.

In operation, bulk liquid from the bulk liquid storage tank 258 enters the dissolved gas generators 229, 231, 238, and 241 under pressure and flows through the radial grooves where the venturi draws pure oxygen from the low-pressure storage tank 267 through piping 264 and saturates the bulk liquid flowing through the device with pure oxygen. Operation of the dissolved gas generators 229, 231, 238, and 241 is described in detail in the discussions of FIG. 8.

The operation of the aeration system is monitor and controlled by the controller 222. Oxygen is supplied by the gas supply and recycling sub system as described above. The sensor 249 located in the line upstream of pump 250 monitors the amount of dissolved oxygen in the biomass as it flows out of the bioreactor vessel 223 and is used by the controller to determine the amount of dissolved oxygen remaining in the volume of biomass in the bioreactor vessel 223. Sensors 226, 230, 240, and 244 monitor the amount of dissolved oxygen in the biomass as it flows out of each dissolved gas generator 229, 231, 238, and 241 and used by the controller 222 to determine the amount of dissolved oxygen being added to the biomass in the bioreactor vessel 223. By comparing the amount of dissolved oxygen remaining in the biomass in the bioreactor vessel 223 and the amount being added by the dissolved gas generators 229, 231, 238, and 241 the controller can regulator the total amount of dissolved oxygen in the biomass to within a range preset in the controller 222 and startup or shutdown individual dissolved gas generators by turning the associated circulating pumps 252 or 253 on or off and opening or closing the corresponding gas supply valves 227, 232, 239, or 243. The use of dissolved oxygen for aeration alleviates the serious problem of foaming typically experienced by bubbling air through the systems.

The ultrafilter sub system consists generally of a pump 270 and three ultrafilters 275, 276, and 277. In operation bulk liquid is drawn by pump 270 from the bulk liquid storage tank 258 through outlet port 269 and pumped through piping 271 and through ultrafilters 275, 276, and 277 and membrane interconnecting piping 278 and 272 where some of the liquid is removed by the ultrafilters and flows out of the membranes through piping 280. The liquid removed by the ultrafilters flows out of the system through piping 273. The bulk liquid from piping 280 is returned to the bioreactor vessel 223 through inlet port 236.

Figure 12:
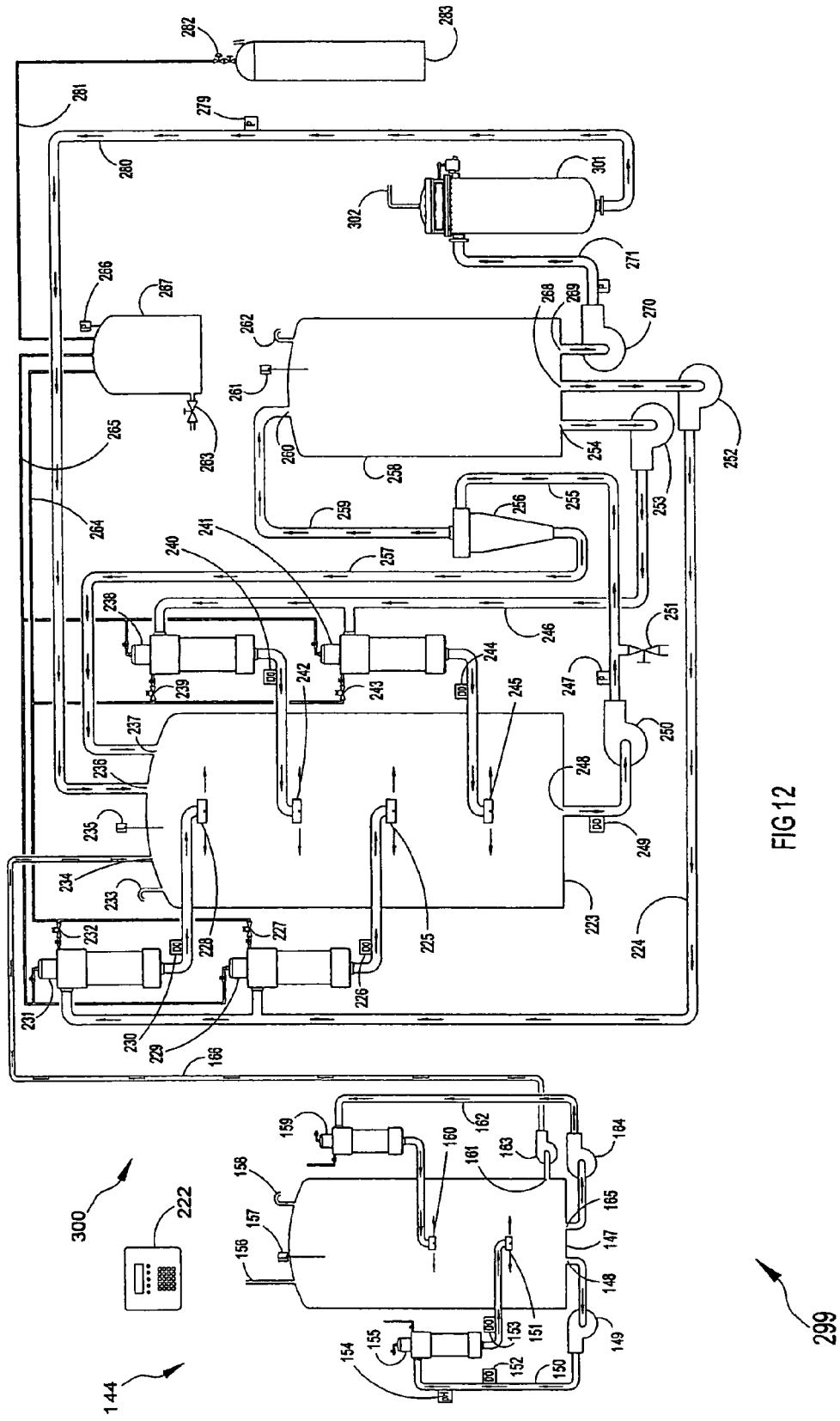
FIG. 12 depicts a schematic illustration of a third embodiment of a membrane reactor fluid treatment system.

FIG. 12 depicts a schematic illustration of a third embodiment of a membrane bioreactor fluid treatment system 299 for biodegradation of organic contaminants in wastewater in accordance with one embodiment of the present invention. The arrows in the piping indicate the direction of fluid flow. The membrane bioreactor fluid treatment system consists of an equalization system 144 to merge various streams of wastewater and equalize the flowrate and contaminant level into one stream, a membrane bioreactor system 300 where the biomass is concentrated and biodegradation occurs, and a controller 222 to monitor and control the operation. The equalization system 144 is the same equalization system 144 as the one in the membrane bioreactor fluid treatment system 143 illustrated in FIG. 10 and incorporated here by reference to the FIG. 10 discussions.

The membrane bioreactor system 300 consists generally of bioreactor vessel 223 in which the biodegradation occurs, an aeration system to supply dissolved oxygen and saturate the bulk liquid with pure oxygen to promote activity of the bacteria, a biomass separation sub system to divide the biomass into bulk slurry and bulk liquid streams, and an ultrafilter sub system to concentrate the biomass in the bioreactor vessel 223 by removing some of the liquid and retaining all suspended solids including bacteria. Using pure oxygen increases the saturation concentration by approximately 4.7 times that available by using air.

The bioreactor vessel 223, the aeration system, and the biomass separation system are the same as those in the membrane bioreactor fluid treatment system 219 illustrated in FIG. 11 and incorporated in this discussion by reference to the FIG. 11 discussions.

The ultrafilter sub system consists generally of a pump 270 and a rotating membrane ultrafilter 301. The rotating membrane ultrafilter is discussed below. In operation bulk liquid is drawn by pump 270 from the bulk liquid storage tank 258 through outlet port 269 and pumped through piping 271 and through the ultrafilter 301 where a high percentage of the liquid is removed by the ultrafilter and flows out of the membranes through piping 280. The liquid removed by the ultrafilter flows out of the system through piping 302. The bulk liquid from piping 280 is returned to the bioreactor vessel 223 through inlet port 236.

FIGS. 13A-21 depict a rotating membrane ultrafilter 303 with a single rotating membrane to illustrate the principles involved. The shear forces created by the cross flow of a high velocity flowing fluid can be replaced, and enhanced, by a rotating membrane in the wastewater. By rotating the membrane with a mechanical drive, differential pressure across the membrane can be lowered, the membrane flux can be increased, and power of the pump used to cause the high velocity flow can be greatly reduced with an associated reduction in energy consumption. The amount of liquid removed depends on the specific organic contaminants in the wastewater; however, a much higher percentage of liquid can typically be removed with each pass through a rotating membrane ultrafilter than through a static membrane ultrafilter under the same operating conditions.

Figure 13A:
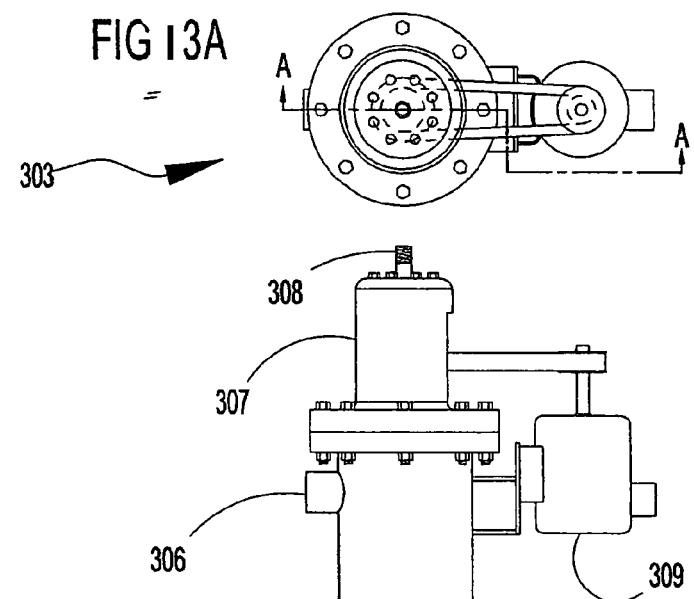
FIG. 13A illustrates a top view of the rotating membrane ultrafilter 303 and shows where a vertical cross sectional view A-A is taken and shown in a subsequent illustration.

FIG. 13A illustrates a top view of the rotating membrane ultrafilter 303 and shows where a vertical cross sectional view A-A is taken and shown in a subsequent illustration.

Figure 13B:
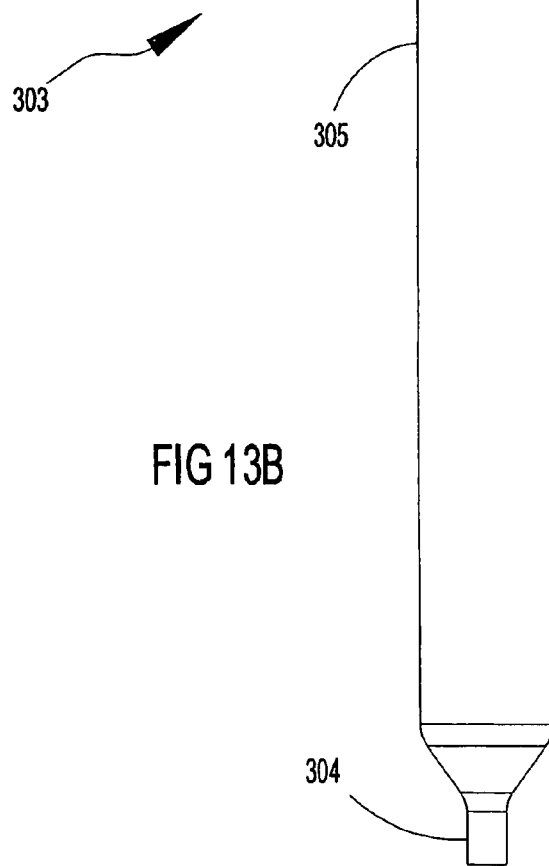
FIG. 13B illustrates a side elevation view of the rotating membrane ultrafilter 303 to identify general components. The rotating membrane ultrafilter 303 consists of lower housing 305, a membrane drive assembly 307, a motor 309, a wastewater inlet 306, a reject water outlet 304, and a permeate outlet 308.

FIG. 13B illustrates a side elevation view of the rotating membrane ultrafilter 303 to identify general components. The rotating membrane ultrafilter 303 consists of lower housing 305, a membrane drive assembly 307, a motor 309, a wastewater inlet 306, a reject water outlet 304, and a permeate outlet 308.

Figure 14:
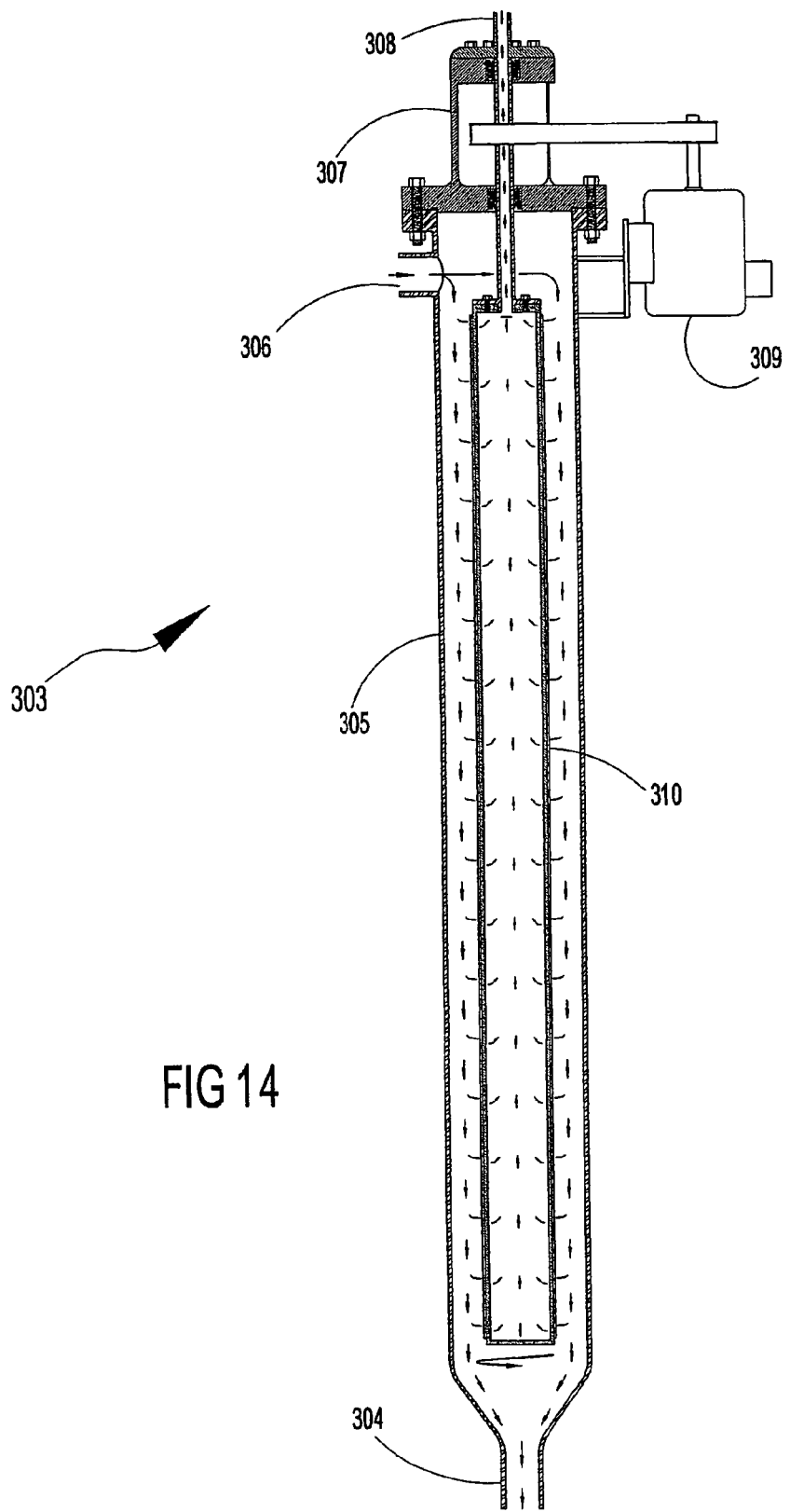
FIG. 14 depicts a sectional view A-A taken from FIG. 13A.

FIG. 14 depicts a sectional view A-A taken from FIG. 13A to illustrate internal components and fluid flow. The arrows indicate the direction of flow. Wastewater enters the ultrafilter 303 through inlet 306, flows downward around the rotating membrane 310 driven by the motor 309. Liquid is removed from the stream as permeate through the membrane. The biomass is concentrated in the reject and flows out the bottom of the lower housing 305 through bottom outlet 304. The permeated is collected inside the membrane 310 and flows upward through the hollow shaft of the membrane drive 307 and out through the permeate outlet 308.

Figure 15:
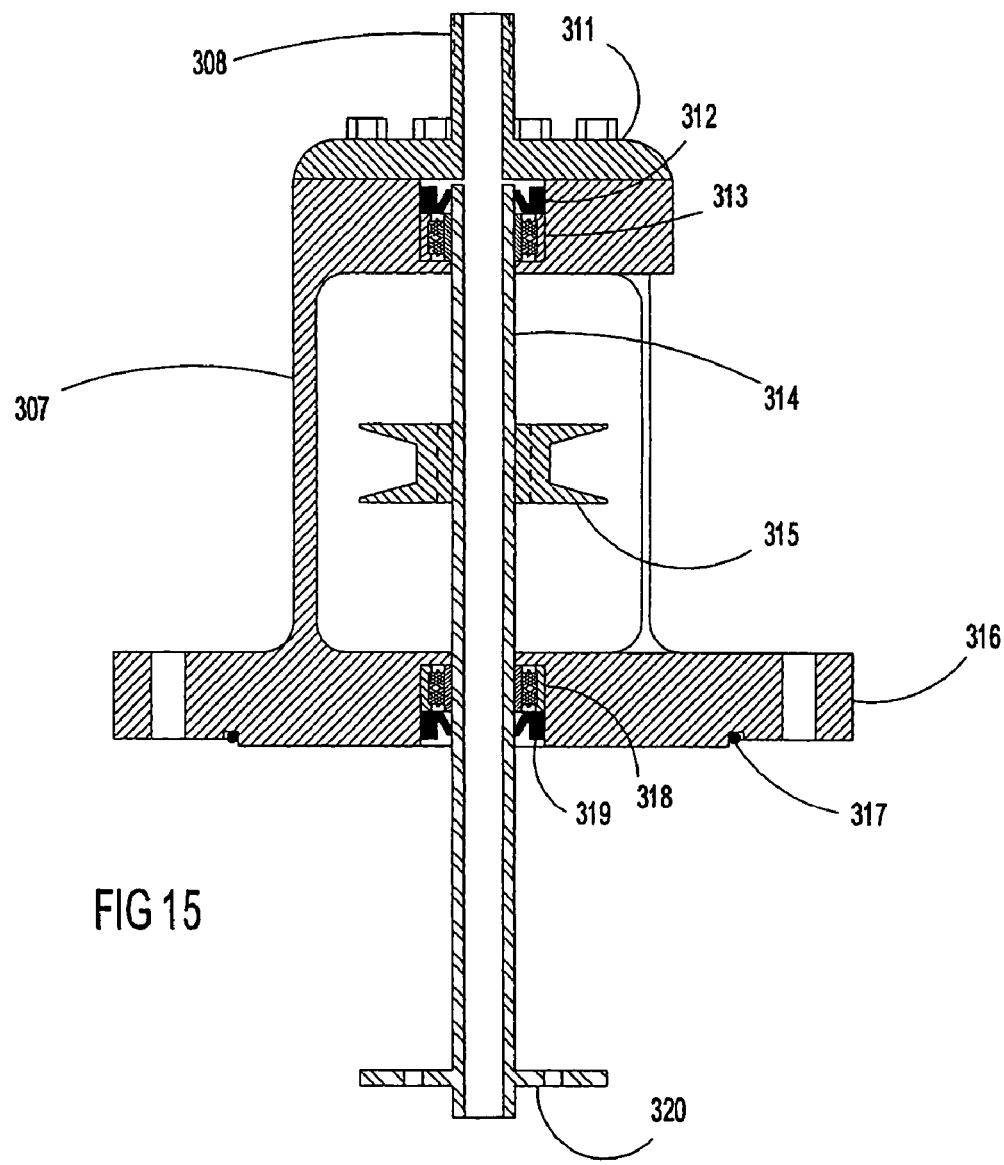
FIG. 15 depicts a schematic illustration of the membrane drive assembly.

FIG. 15 depicts a schematic illustration of the membrane drive assembly 307. The membrane drive assembly 307 consists of a base 316, an upper outlet 308, a hollow drive shaft 314 with a membrane connection flange 320, a drive pulley 315, an upper seal 311 and bearing 312, a lower seal 319 and bearing 318, and a seal 317 to seal between the membrane drive assembly 307 and the lower housing 305. The drive pulley 315 illustrated is not intended as a limitation on the type of drive mechanism used. A chain and sprocket drive or a gear drive could rotate the hollow drive shaft 314 as well.

Figure 16:
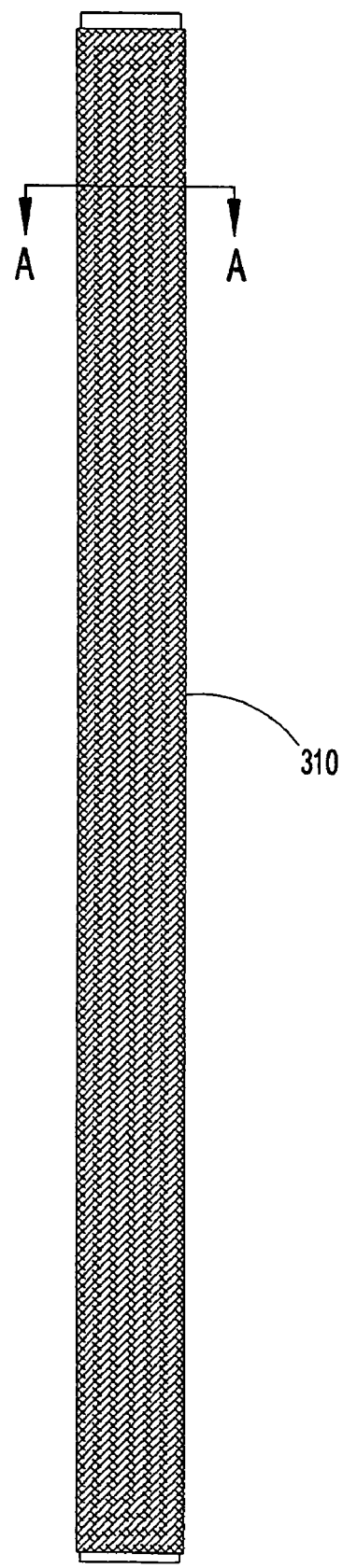
FIG. 16 is an elevation view of a membrane.

FIG. 16 is an elevation view of the membrane 310 in the rotating membrane ultrafilter 303. A cross section A-A of the membrane 310 is taken and shown in the subsequent illustration.

FIG. 17 illustrates the cross section A-A of the membrane 310 taken from FIG. 16. The membrane 310 consists of a porous or perforated inner support cylinder 321, and porous membrane support 322 attached to the inner support cylinder 321, and a thin membrane surface made by modifying the surface of the porous membrane support 322. The inner support cylinder may be made of perforated metal, porous sintered metal, or other material such as ceramic. The modification of the porous membrane support 322 to make the membrane from various materials is commercially available from a number of companies. The entire membrane may be a commercially available ceramic membrane. Rotating membrane ultrafilters can be made with any number of rotating membranes. In addition, the rotating membrane may be used for microfilters, nanofilters, or reverse osmosis.

The surface velocity of the membrane is determined by the rotating speed and the diameter of the membrane. For example, a membrane of 4.313-inch diameter rotating at 1,000 revolutions per minute would have a surface velocity of approximately 18 feet per second in contact with the wastewater.

FIGS. 18A-20 depict a rotating membrane ultrafilter 301 in the membrane bioreactor fluid treatment system 299 illustrated in the fluid schematic of FIG. 12. The rotating membrane ultrafilter 301 has 19 membranes; however, any number of rotating membranes may be used without varying from the spirit and intent of the present invention.

Figure 18A:
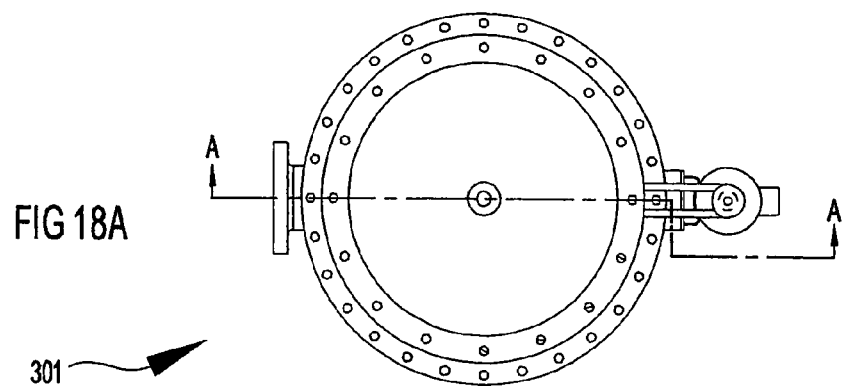
FIG. 18A illustrates a top view of a rotating membrane ultrafilter.

FIG. 18A illustrates a top view of the rotating membrane ultrafilter 301 and shows where a vertical cross sectional view A-A is taken and shown in a subsequent illustration.

Figure 18B:
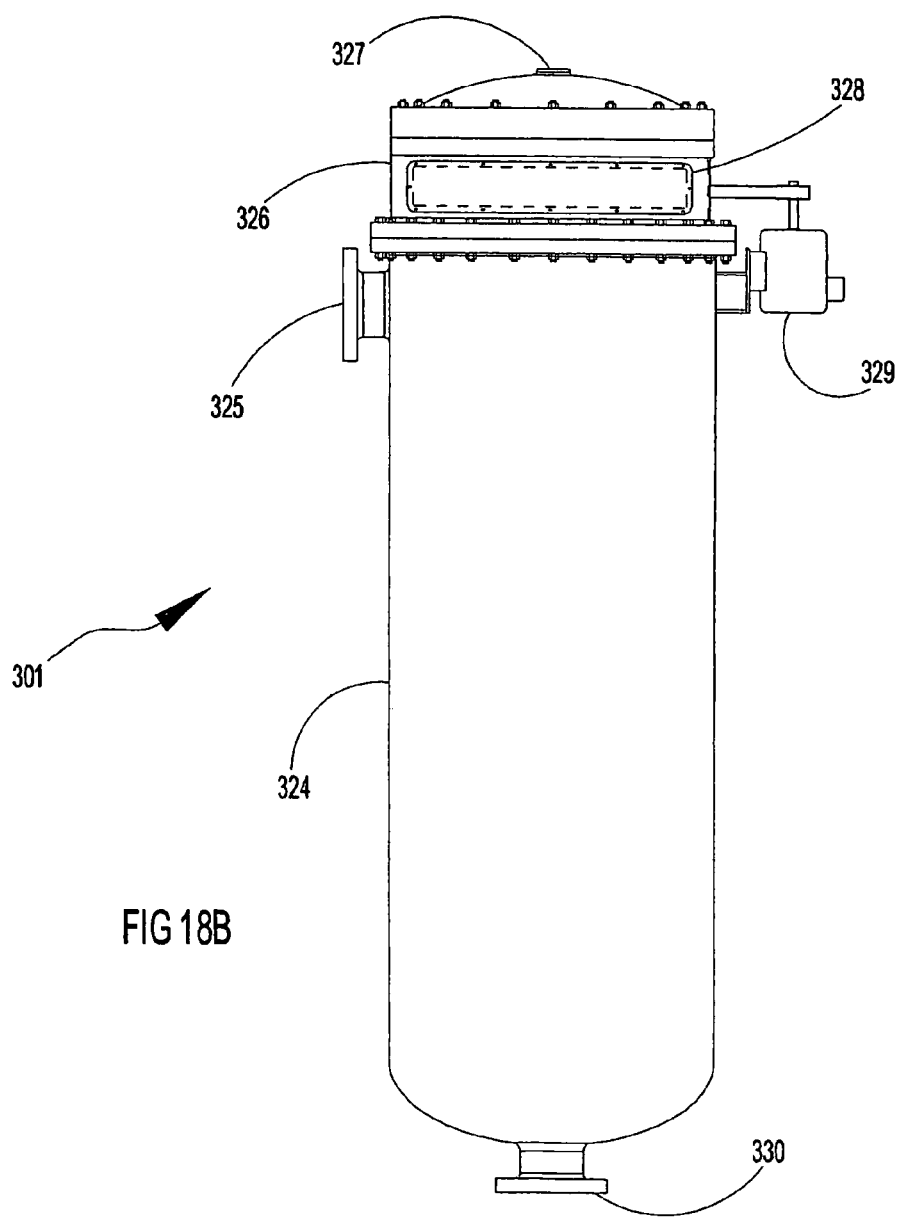
FIG. 18B illustrates a side elevation view of the rotating membrane ultrafilter.

FIG. 18B illustrates a side elevation view of the rotating membrane ultrafilter 301 to identify general components. The rotating membrane ultrafilter 301 consists of lower housing 324, a membrane drive assembly 326, a motor 329, a wastewater inlet 325, a reject water outlet 330, a permeate outlet 327, and an access panel 328 on the membrane drive assembly 326.

Figure 19:
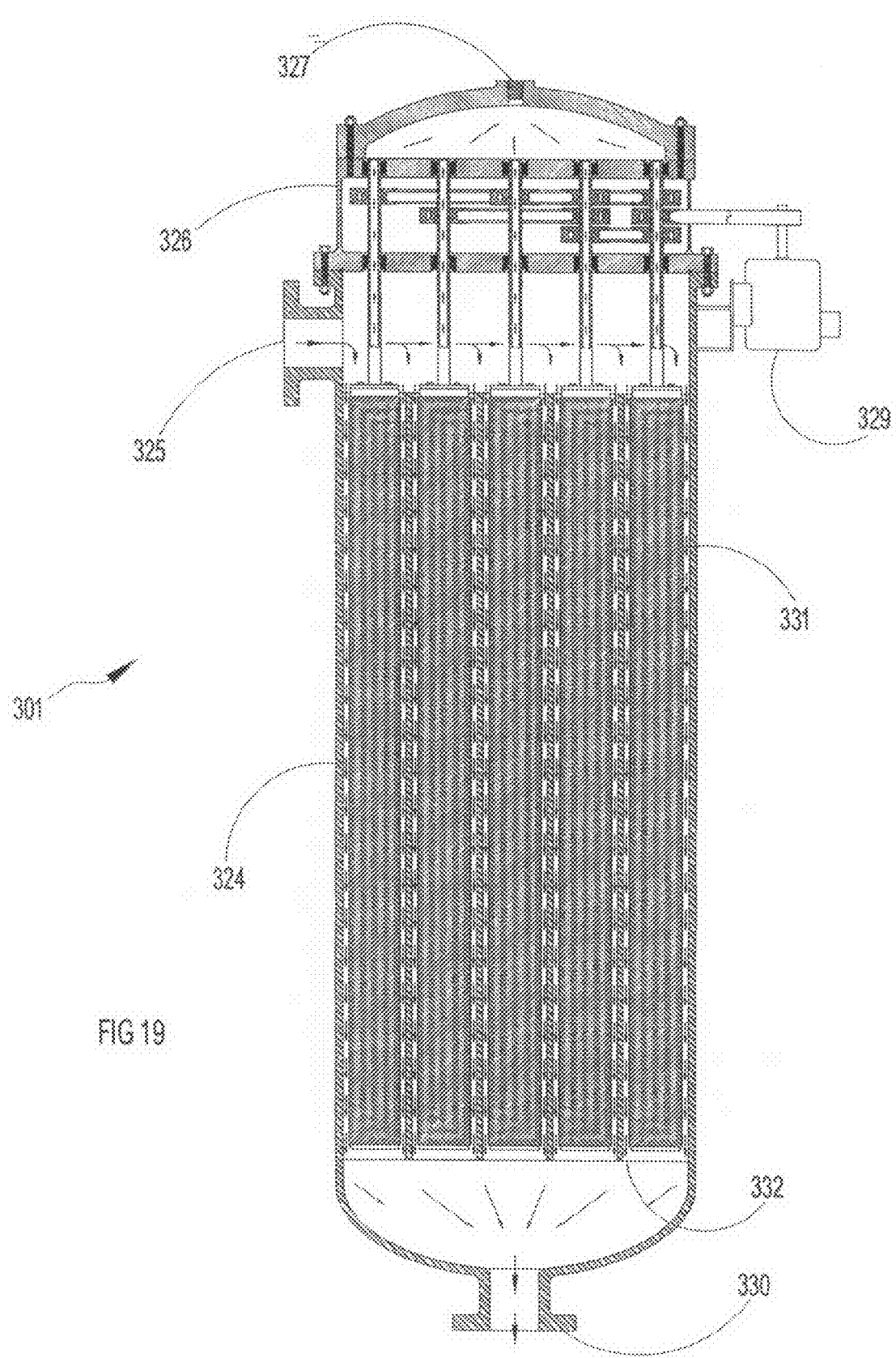
FIG. 19 depicts a sectional view A-A taken from FIG. 18A.

FIG. 19 depicts a sectional view A-A taken from FIG. 18A to illustrate internal components and fluid flow. The membranes 331 are the same as described above. An insert 332 inside the lower housing 324 forces the wastewater to flow near the rotating membranes 331 where water is removed and the biomass is concentrated. The arrows indicate the direction of flow. Wastewater enters the ultrafilter 303 through inlet 306, flows downward around the rotating membrane 310 driven by the motor 309. Liquid is removed from the stream as permeate through the membrane. The biomass is concentrated in the reject and flows out the bottom of the lower housing 305 through bottom outlet 304. The permeated is collected inside the membrane 310 and flows upward through the hollow shaft of the membrane drive 307 and out through the permeate outlet 308.

Figure 20:
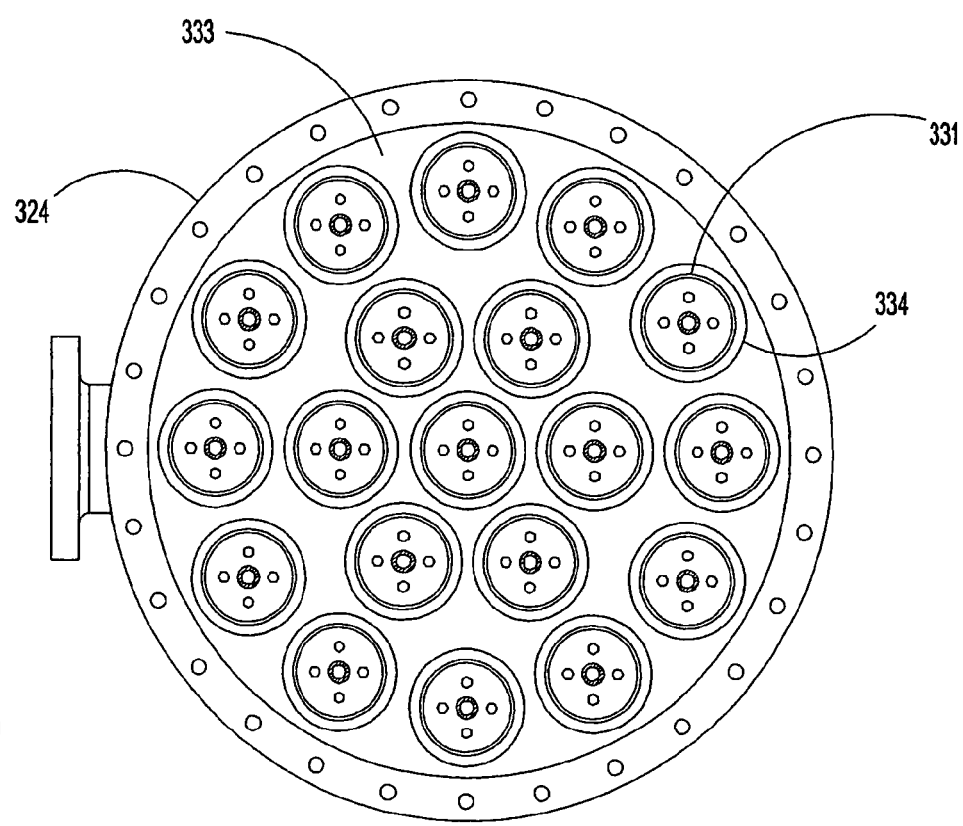
FIG. 20 provides a view downward inside a lower housing of one embodiment of the present invention.

FIG. 20 provides a view downward inside the lower housing 324 to illustrate how the rotating membranes 331 are positioned inside cylindrical passages 334 in the insert 333. Wastewater flows downward through the cylindrical passages 334 adjacent to the rotating membranes 331. The shearing forces caused by the rotation of the membranes 331 prevent the membranes from fouling. By keeping the membranes from fouling, a higher flux can be obtained at a lower differential pressure across the membranes. Since wastewater velocity is not a factor a large percentage of the inlet flow can be removed as permeate with each passage through the ultrafilter 301.

Figure 21:
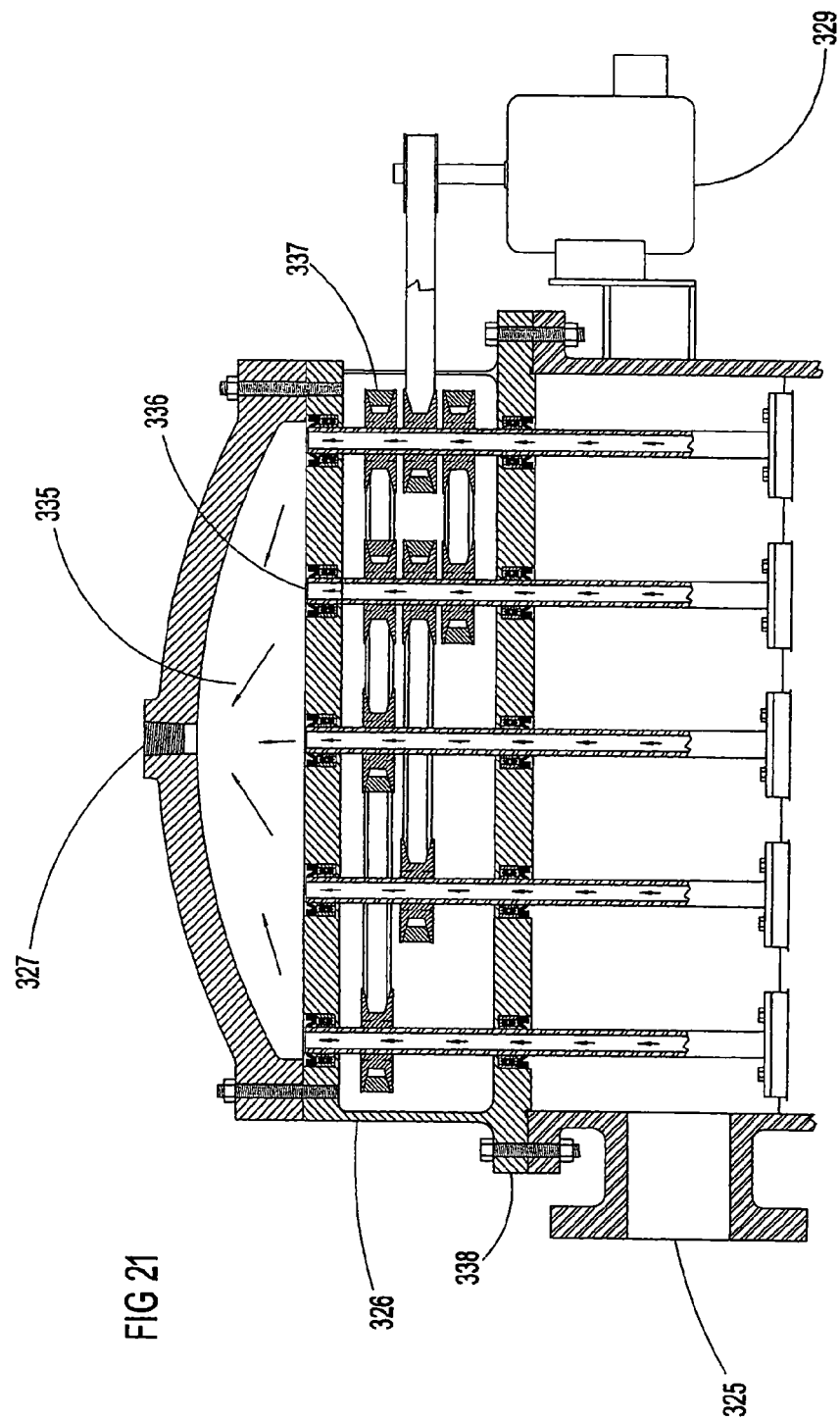
FIG. 21 provides an enlarged schematic illustration of a membrane drive assembly.

FIG. 21 provides an enlarged schematic illustration of the membrane drive assembly 326. The membrane drive assembly 326 consists of a base 339, a permeate collection chamber 335, an upper outlet 327, and a hollow shaft belt drive system 337. The simple belt drive system 337 illustrated is not intended as a limitation on the type of drive mechanism used. A chain and sprocket drive or a gear drive could rotate the hollow drive shafts as well.

Biomass that cannot be consumed by bacteria, such as minerals, is periodically charged from the system through valve 251.

What is claimed is:

1. A rotating membrane ultrafilter to remove a liquid from wastewater, comprising:
    a cylindrical lower housing having a wastewater inlet and an outlet;
    a tubular membrane concentric with and rotating within the lower housing, the tubular membrane having an interior; and
    a drive assembly to rotate the tubular membrane within the lower housing, the drive assembly having a hollow shaft having one end defining a permeate outlet and another end connected to and in fluid communication with the interior of the tubular membrane to connect the interior of the membrane with the permeate outlet,
    whereby wastewater enters the wastewater inlet and travels in an annulus between the rotating tubular membrane and cylindrical lower housing, the liquid permeating through the tubular membrane into the interior of the tubular membrane and out the permeate outlet, the remaining wastewater exiting the outlet of the lower housing.

2. The ultrafilter of claim 1 whereby the membrane comprises:
    an inner support cylinder;
    a porous membrane support attached to the inner support cylinder; and
    a thin membrane surface.

3. The ultrafilter of claim 1 whereby the drive assembly further comprises a drive motor having a pulley to rotate hollow drive shaft to rotate the tubular membrane.

4. A rotating membrane ultrafilter to remove liquid from wastewater, comprising:
    a cylindrical lower housing having a wastewater inlet and an outlet;

a tubular membrane concentric with and rotating within the lower housing, the tubular membrane having an interior; and a drive assembly to rotate the tubular membrane within the lower housing having a permeate outlet, whereby wastewater enters the wastewater inlet and travels in an annulus between the rotating membrane and cylindrical lower housing, liquid permeating through the tubular membrane into the interior of the tubular membrane and out the permeate outlet, the remaining wastewater exiting the outlet of the lower housing, in which the drive assembly has a hollow shaft having one end defining the permeate outlet and another end connected to and in fluid communication with the interior of the cylindrical membrane to connect the interior of the membrane with the permeate outlet.

5. The ultrafilter of claim 4 whereby the membrane comprises:

an inner support cylinder;

a porous membrane support attached to the inner support cylinder; and a membrane surface.

6. The ultrafilter of claim 4 in which the drive assembly further comprises a drive motor having a pulley functionally associated with the shaft to rotate the shaft to rotate the tubular membrane.

7. The ultrafilter of claim 4 in which the tubular membrane is concentric with the housing.

8. The ultrafilter of claim 4, comprising:

a first wall defining a first cylindrical passage adjacent the tubular membrane, the tubular membrane concentric with the first wall; and a second tubular membrane rotating within a second wall defining a second cylindrical passage adjacent the second tubular membrane, the second tubular membrane having an interior, the second tubular membrane concentric within the second wall, in which the drive assembly is adapted to rotate the first and second tubular membranes within the first and second cylindrical passages in the housing.

9. The ultrafilter of claim 8 in which the drive assembly further comprises a drive motor having a plurality of pulleys adapted to rotate the first and second hollow shafts.

10. A rotating membrane ultrafilter to remove liquid from wastewater, comprising:

a cylindrical lower housing having a wastewater inlet and an outlet;

a tubular membrane concentric with and rotating within the lower housing, the tubular membrane having an interior; and a drive assembly to rotate the tubular membrane within the lower housing having a permeate outlet, whereby wastewater enters the wastewater inlet and travels in an annulus between the rotating membrane and cylindrical lower housing, liquid permeating through the tubular membrane into the interior of the tubular membrane and out the permeate outlet, the remaining wastewater exiting the outlet of the lower housing, in which the drive assembly has a hollow shaft having one end defining the permeate outlet and another end connected to and in fluid communication with the interior of the cylindrical membrane to connect the interior of the membrane with the permeate outlet;

a first wall defining a first cylindrical passage adjacent the tubular membrane, the tubular membrane concentric with the first wall; and a second tubular membrane rotating within a second wall defining a second cylindrical passage adjacent the second tubular membrane, the second tubular membrane having an interior, the second tubular membrane concentric within the second wall, in which the drive assembly is adapted to rotate the first and second tubular membranes within the first and second cylindrical passages in the housing.

11. The ultrafilter of claim 8 or 10 in which the drive assembly has a plurality of hollow shafts, each shaft having one end in fluid communication with a permeate outlet and another end of each shaft connected to and in fluid communication with one of the interiors of the plurality of tubular membranes to connect the interior of said membrane with permeate outlet, whereby wastewater enters the wastewater inlet and travels in the passages around the plurality of tubular membranes, liquid permeating through to the interior of the plurality of tubular membranes and out the permeate outlet, the remaining wastewater exiting the outlet of the lower housing.

12. The ultrafilter of claim 8 or 10 in which the housing further comprises an insert adjacent a lower end of the housing to force the wastewater to flow near the rotating membranes, the insert being connected to the walls.

* * * * *